(12) United States Patent
Brown

(10) Patent No.: US 12,730,049 B2
(45) **Date of Patent: *Sep. 8, 2026**

(54) ENABLING AN AUTOMATED ASSISTANT TO LEVERAGE ODOR SENSOR(S) OF CLIENT DEVICE(S)

(71) Applicant: GOOGLE LLC, Mountain View, CA (US)

(72) Inventor: Evan Brown, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/812,862

(22) Filed: Aug. 22, 2024

(65) Prior Publication Data

US 2024/0410803 A1 Dec. 12, 2024

Related U.S. Application Data

(63) Continuation of application No. 17/548,945, filed on Dec. 13, 2021, now Pat. No. 12,117,463.

(51) Int. Cl.
*G01N 7/04* (2006.01)
*H04L 67/52* (2022.01)

(52) U.S. Cl.
CPC ............... *G01N 7/04* (2013.01); *H04L 67/52* (2022.05)

(58) Field of Classification Search
None
See application file for complete search history.

(56) References Cited

U.S. PATENT DOCUMENTS 6,903,723 B1 * 6/2005 Forest ................... G06F 3/0483 345/157
11,204,344 B1 12/2021 Bazemore
(Continued)

FOREIGN PATENT DOCUMENTS

CN 2879557 3/2007
CN 108885904 11/2018
(Continued)

OTHER PUBLICATIONS

Galan et al.; The Sense of Smell in Social Robots; 798-1-4577-2119-9/12; IEEE; 6 pages; dated 2011.
(Continued)

*Primary Examiner* — David J Stoltenberg
(74) *Attorney, Agent, or Firm* — Gray Ice Higdon

(57) ABSTRACT

Implementations described herein are directed to leveraging odor sensor(s) of client device(s) in responding to user request(s) and/or in generating notification(s). Processor(s) of a given client device can receive a request to identify an odor in an environment of the given client device, process an odor data instance generated by the odor sensor(s) of the given client device, identify the odor based on processing the odor data instance, generate a response that identifies the odor and/or a source of the odor, and cause the response to the request to be rendered via the given client device. Processor(s) of the given client device can additionally, or alternatively, establish baseline odor(s) in the environment and generate a notification when an odor is detected that does not correspond to the baseline odor(s) and/or exclude the baseline odor(s) in generating the response to the request.

20 Claims, 8 Drawing Sheets

(56) References Cited

U.S. PATENT DOCUMENTS

| | | | |
|---|---|---|---|
| 2009/0043580 A1 | 2/2009 | Mozer | |
| 2011/0181421 A1 | 7/2011 | Nabata et al. | |
| 2016/0171339 A1* | 6/2016 | Choi | G06F 18/256 382/103 |
| 2018/0268806 A1* | 9/2018 | Chun | G10L 13/027 |
| 2020/0151601 A1* | 5/2020 | Niewczas | G06N 7/01 |
| 2020/0183925 A1* | 6/2020 | Amin | G06F 16/2455 |
| 2020/0342011 A1 | 10/2020 | Miller | |
| 2021/0033582 A1 | 2/2021 | Gafsou | |
| 2021/0325343 A1* | 10/2021 | Matsuoka | G01N 33/0034 |
| 2021/0352115 A1 | 11/2021 | Hansen | |
| 2022/0034857 A1 | 2/2022 | Zhou | |
| 2022/0067093 A1* | 3/2022 | Su | G01N 33/0001 |
| 2022/0246304 A1* | 8/2022 | Shyu | G16H 40/20 |
| 2022/0260539 A1 | 8/2022 | Yun | |
| 2023/0061026 A1 | 3/2023 | Shimizu | |
| 2023/0184652 A1 | 6/2023 | Brown | |

FOREIGN PATENT DOCUMENTS

| | | |
|---|---|---|
| CN | 111401129 | 7/2020 |
| WO | 2023038654 | 3/2023 |

OTHER PUBLICATIONS

Sanchez-Lengeling et al.; Machine Learning for Scent: Learning Generalizable Perceptual Representations of Small Molecules; arXiv:1910.10685v2; dated Oct. 25, 2019.

Leo et al.; An Efficient Approach for Preprocessing Data from a Large-Scale Chemical Sensor Array; Sensors; 14; 17786-17806; doi: 10.3390/s140917786; dated 2014.

European Patent Office; Communication issued in Application No. 22197823.2; 8 pages; dated Mar. 16, 2023.

European Patent Office; International Search Report and Written Opinion issued in Application No. PCT/US2021/063338; 14 pages; dated Aug. 18, 2022.

"New smartphone app can act as electronic nose to detect your scent" Dated Mar. 27, 2018. 3 pages. Retrieved from: https://www.bgr.in/news/new-smartphone-app-can-act-as-electronic-nose-to-detect-your-scent-597870/#:~:text=Nanoscent%2C%20an%20Israel-based%20start,them%2C%20timesofisrael.com%20reported.

"Aroma Bit to Develop Smartphone Embeddable Ultra-compact Silicon CMOS Based Smell Sensor That Has Dog Nose Equivalent Resolution in 1mm Squared Die Size" Aroma Bit Silicon Sensor Technology Inc. Dated Jun. 28, 2019. 5 pages.

Arroyo et al., "Eclectronic Nose with Digital Gas Sensors Connected via Bluetooth to a Smartphone for Air Quality Measurements" Sensors 2020, 20, 786; doi:10.3390/s20030786. 16 pages.

Tan et al., "Applications of Electronic nose (e-nose) and electronic tongue (e-tongue) in food quality-related properties determination: A review" Artificial Intelligence in Agriculture 4 (2020) 104-115. https://doi.org/10.1016/j.aiia.2020.06.003. 12 pages.

Tim Collins, "The phone that could save your life: World's first mobile that contains a sensor able to smell indoor air pollutants (and it also has a thermal imaging camera)" Retreived from https:///www.dailymail.co.uk/sciencetech/article-5423281/Cat-launches-handset-detect-toxic-chemicals.html. 5 pages.

Schuman et al., "The game-changing potential of smartphones that can smell" IDG Communications, Inc. 2020. 5 pages.

Wiltschko et al., "Learning to Smell: Using Deep Learning to Predict the Olfactory Properties of Molecules" Google AI Blog. Dated Oct. 24, 2019. 5 pages.

Intellectual Property India, Hearing Notice issued in Application No. 202417037040, 9 pages, dated Feb. 2, 2026.

Intellectual Property India, Examination Report issued in Application No. 202417037040, 13 pages, dated Oct. 28, 2025.

European Patent Office; Communication pursuant to Article 94(3) EPC issued in Application No. 22197823.2; 6 pages; dated Mar. 31, 2026.

* cited by examiner

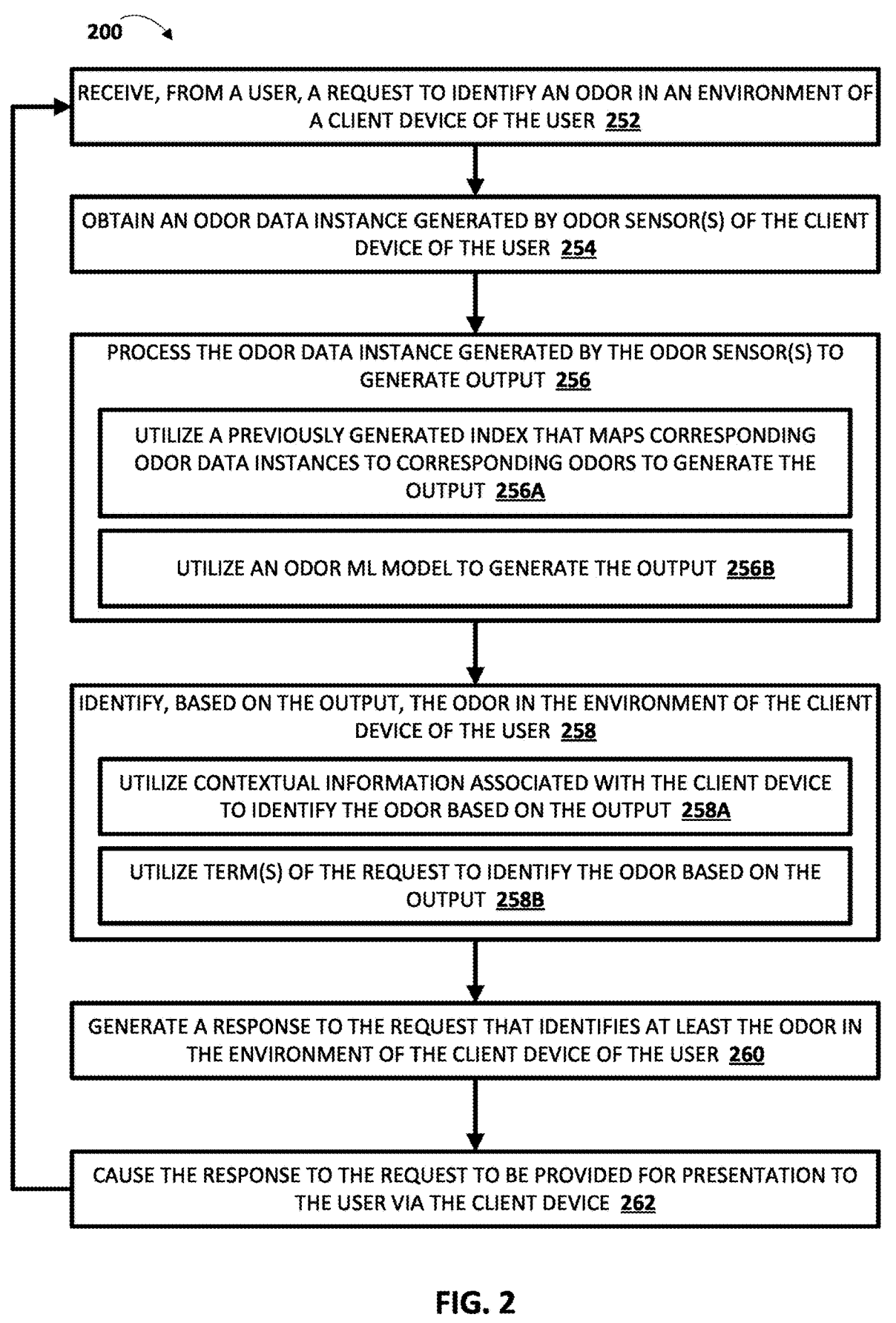

200

RECEIVE, FROM A USER, A REQUEST TO IDENTIFY AN ODOR IN AN ENVIRONMENT OF A CLIENT DEVICE OF THE USER 252

OBTAIN AN ODOR DATA INSTANCE GENERATED BY ODOR SENSOR(S) OF THE CLIENT DEVICE OF THE USER 254

PROCESS THE ODOR DATA INSTANCE GENERATED BY THE ODOR SENSOR(S) TO GENERATE OUTPUT 256

UTILIZE A PREVIOUSLY GENERATED INDEX THAT MAPS CORRESPONDING ODOR DATA INSTANCES TO CORRESPONDING ODORS TO GENERATE THE OUTPUT 256A

UTILIZE AN ODOR ML MODEL TO GENERATE THE OUTPUT 256B

IDENTIFY, BASED ON THE OUTPUT, THE ODOR IN THE ENVIRONMENT OF THE CLIENT DEVICE OF THE USER 258

UTILIZE CONTEXTUAL INFORMATION ASSOCIATED WITH THE CLIENT DEVICE TO IDENTIFY THE ODOR BASED ON THE OUTPUT 258A

UTILIZE TERM(S) OF THE REQUEST TO IDENTIFY THE ODOR BASED ON THE OUTPUT 258B

GENERATE A RESPONSE TO THE REQUEST THAT IDENTIFIES AT LEAST THE ODOR IN THE ENVIRONMENT OF THE CLIENT DEVICE OF THE USER 260

CAUSE THE RESPONSE TO THE REQUEST TO BE PROVIDED FOR PRESENTATION TO THE USER VIA THE CLIENT DEVICE 262

FIG. 2

ENABLING AN AUTOMATED ASSISTANT TO LEVERAGE ODOR SENSOR(S) OF CLIENT DEVICE(S)

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components in interpreting and responding to spoken utterances and/or other user inputs (e.g., typed input, touch input, etc.). For example, an automatic speech recognition (ASR) engine can process audio data that correspond to a spoken utterance of a user to generate ASR output, such as speech hypotheses (i.e., sequence of term(s) and/or other token(s)) of the spoken utterance. Further, a natural language understanding (NLU) engine can process the ASR output (or touch/typed input) to generate NLU output, such as one or more predicted intents expressed by the user in providing the spoken utterance (and/or other user inputs) and optionally slot value(s) for parameter(s) associated with each of the one or more predicted intents. Moreover, a fulfillment engine can be used to process the NLU output, and to generate one or more structured requests to be transmitted to various fulfillers to obtain fulfillment output, such as content to be provided for presentation to the user responsive to the spoken utterance and/or an action to be performed by the automated assistant or another computing device responsive to the spoken utterance.

However, the aforementioned pipeline of components may be insufficient for responding to certain types of requests. For example, assume a user of a client device wishes to identify an odor in an environment of the client device. In this example, the user may invoke an automated assistant executing at least in part at the client device and provide certain terms that are descriptive of the odor such as pungent, sweet, damp, etc. Notably, these terms are descriptive of a multitude of different types of odors that may originate from countless sources. Accordingly, the NLU output may include insufficient slot values to accurately describe the odor, and, as a result, the fulfillment output may not correctly identify the odor. This may result in the user submitting additional requests to identify the odor, thereby resulting in an increased quantity of user inputs directed to the client device based at least on the additional requests and an increased consumption of computational resources at the client device based on processing the additional requests. Moreover, this problem may be exacerbated when certain people perceive the same odor differently and use different terms to describe the odor.

SUMMARY

Implementations described herein are directed to providing client devices that include one or more odor sensors, and enabling an automated assistant executing at least in part at the client devices to leverage odor data instances generated by one or more of the odor sensors of the client devices in responding to user requests received at the client devices and/or in generating notifications at the client devices. Processor(s) of a given client device can receive, from a user of the given client device, a request to identify an odor in an environment of the given client device, process a given odor data instance generated by one or more of the odor sensors of the given client device, identify the odor based on processing the odor data instance, generate a response to the request that at least identifies the odor, and cause the response to the request to be provided for presentation to the user via the given client device. Processor(s) of the given client device can additionally, or alternatively, establish one or more baseline odors in the environment of the given client device based on processing odor data instances generated over a time interval, and exclude the one or more baseline odors from consideration in identifying the odor in response to receiving the request. Processor(s) of the given client device can additionally, or alternatively, establish one or more of the baseline odors in the environment of the given client device based on processing odor data instances generated over a time interval, generate a notification in response to identifying a given odor in the environment of the given client device that is in addition to the one or more baseline odors, and cause the notification to be provided for presentation to the user via the given client device.

For example, assume the user of the given client device provides a spoken utterance of "Assistant, what's that smell?" In this example, the automated assistant can cause audio data capturing the spoken utterance to be processed using various machine learning (ML) models to determine the spoken utterance includes the request to identify an odor in an environment of the given client device. Accordingly, in response to receiving the spoken utterance, the automated assistant can cause an odor data instance to be generated via one or more of the odor sensors of the given client device. Further, the odor data instance can be processed to identify the odor in the environment of the given client device of the user. In this example, assume the odor corresponds to hydrogen sulfide gas. In this example, the response to the request can be generated based on the processing of the odor data instance and provided for presentation to the user in response to receiving the spoken utterance, such as "you are probably referring to the smell of hydrogen sulfide gas". Also, for example, and assuming that the automated assistant has established one or more baseline odors in the environment of the given client device and that the one or more baseline odors exclude hydrogen sulfide gas, the automated assistant can additionally, or alternatively, generate a notification that identifies the odor in the environment, such as "I'm detecting hydrogen sulfide gas".

In some implementations, the automated assistant may utilize a previously generated odor index that maps odor data instances to odors to identify the odor in the environment of the given client device. The automated assistant can generate the odor index based on processing a plurality of odor data instances, a corresponding label that identifies a corresponding odor (e.g., a chemical compound that identifies the odor) associated with each of the plurality of odor data instances, one or more corresponding characteristics that describe the corresponding odors (e.g., sweet, pungent, etc.), and/or one or more corresponding sources of the corresponding odors (e.g., faulty plumbing, a particular flower or tree, mold, various medical ailments, etc.). For example, the automated assistant can process the plurality of odor data instances to generate the mapping between each of the plurality of odor data instances and the corresponding labels, the one or more corresponding characteristics, and/or the one or more corresponding sources, such that the odor index corresponds to an odor knowledge graph. The automated assistant may subsequently utilize the odor index to generate output that identifies the odor in the environment of the given client device. For example, the automated assistant can compare the odor data instance (or a representation thereof) generated in response to receiving the spoken utterance to the plurality of odor data instances (or corresponding representations thereof) to determine a given odor data instance of the plurality of odor data instances in the odor index that corresponds to the odor data instance, and generate output that identifies a given odor associated with the given odor data instance.

In some versions of those implementations, the automated assistant can index the odor index based on one or more criteria. The one or more criteria may include, for example, the corresponding labels that identifies a corresponding odor, the one or more characteristics that describe the corresponding odors, the one or more sources of the corresponding odors, geographical regions associated with the corresponding odors, times of year associated with the corresponding odors, whether the corresponding odors are encountered indoors or outdoors, and/or any other criteria. The one or more criteria may be subsequently utilized to quickly and efficiently traverse the mapping between the corresponding odor data instances and the corresponding odors (or other data associated with the corresponding odors such as the corresponding labels, the one or more corresponding characteristics, the one or more sources, etc.) by restricting a search space of the odors based on one or more terms included in a request corresponding to one or more of the characteristics (e.g., based on term(s) of the request) and/or based on contextual information associated with the given client device corresponding to contextual information associated with the odors (e.g., a location at which the odor is typically present, a time of year during which the odor is typically present, etc.).

In additional or alternative implementations, the automated assistant may utilize a previously trained odor ML model to identify the odor in the environment of the given client device. The odor ML model may be any suitable ML model that is capable of processing the corresponding given odor data instances and/or one or more of the characteristics associated with the corresponding odor data instances to predict one or more of the labels associated with the corresponding odor data instances and/or one or more of the sources of the corresponding odors associated with the corresponding odor data instances, such as an encoder-decoder network. Further, the automated assistant can train the odor ML model based on a plurality of training instances. Each of the plurality of training instances can include training instance input and training instance output. The training instance input for a given training instance can include, for example, a given odor data instance (e.g., from among the plurality of corresponding odor data instances utilized to generate the odor index) and/or one or more of the characteristics associated with the given odor data instance. Further, the training instance output can include, for example, one or more of the labels associated with the given odor data instance and/or one or more of the sources associated with the given odor data instance. For example, and assuming the odor ML model corresponds to the encoder-decoder network, the automated assistant can utilize the odor ML model to map the corresponding odors to an embedding space or other lower-level space that enables the corresponding odor data instances to be compared.

For example, in training the odor ML model based on a given training instance, the training instance input can be applied as input across the odor ML model to generate an embedding for the given odor data instance. The embedding for the given odor data instance can be mapped to the embedding space and labeled with one or more of the labels associated with the given odor data instance and/or one or more of the sources associated with the given odor data instance included in the training instance output. This process may be repeated for each of the plurality of training instances to populate the embedding space. Further, the embedding space may be distributed based on one or more of the characteristics included in the training instance input. Put another way, sweet odors may be mapped to a first portion of the embedding space, pungent odors may be mapped to a second portion of the embedding space, and so on. This enables similar odors to be grouped together in the embedding space. The odor ML model may be trained based on additional training instances to add corresponding odors to the embedding space. Accordingly, at inference, the automated assistant can process the odor data instance using the odor ML model to map the odor data instance to the embedding space and generate output that identifies an odor that is closest in the embedding space as the odor in the environment of the given client device. In some implementations, and similar to the odor index described above, a search space of the odors may be restricted based on term(s) included in the request and/or contextual information associated with the given client device. In some versions of those implementations, the term(s) of the request and/or the contextual information can be applied as input across the odor ML model along with the odor data instance in generating the embedding, whereas in additional or alternative versions of those implementations, the term(s) of the request and/or the contextual information can be utilized in comparing the generated embedding to the previously generated embeddings by only considering odors having characteristics that match the term(s) and/or that have been detected in the same or similar contextual scenarios.

In some implementations, the automated assistant can establish one or more baseline odors in the environment of the given client device. The automated assistant can cause a plurality of odor data instances to be generated by the one or more odor sensors of the client device at a plurality of time instances across a time interval. Further, the automated assistant can process the plurality of odor data instances using the odor index and/or the odor ML model described above to identify a plurality of odors in the environment of the given client device. Moreover, the automated assistant can classify one or more of the plurality of odors as a baseline odor in response to determining that that the odor is identified in the environment of the client device for a threshold quantity of the time instances across the time interval. Continuing with the above example, assume that the hydrogen sulfide gas is not a baseline odor in an environment of the given client device (e.g., in a primary dwelling of the user). In this example, the response to the request and/or the notification may identify the odor as corresponding to the odor in the environment of the given client device and/or identify a source of the odor (e.g., faulty plumbing in the primary dwelling of the user). In contrast, assume that the hydrogen sulfide gas is a baseline odor in an environment of the given client device (e.g., in a waste management facility where the user works). In this example, the response to the request and/or the notification may exclude the odor.

In various implementations, the automated assistant may generate a query based on the request received from the user and/or based on the identified odor. Continuing with the above example, assume that the hydrogen sulfide gas is identified as the odor in the environment of the client device. In this example, the automated assistant can generate a query for hydrogen sulfide gas and cause the query to be executed via a search engine and/or over one or more databases.

Further, the automated assistant can include, in the response and/or the notification, content obtained responsive to the query. For instance, and assuming that the client device is located in the primary dwelling of the user, the content obtained responsive to the query can include an indication of potential sources of the hydrogen sulfide gas (e.g., faulty plumbing in an environment of the client device), an indication one or more suggested actions for ridding the environment of the hydrogen sulfide gas (e.g., a list of one or more local plumbers), one or more facts associated with hydrogen sulfide gas, and/or any other information associated with hydrogen sulfide gas.

In various implementations, the response and/or the notification can be audibly rendered for audible presentation to the user via microphone(s) of the given client device. In additional or alternative implementations, the response and/or the notification can be visually rendered for visual presentation to the user via a display of the given client device. In some implementations, how the response and/or the notification is provided for presentation to the user may be based on device capabilities of the given client device of the user. For example, in implementations where the given client device lacks a display, the response and/or the notification may only be provided for audible presentation to the user via the microphone(s) of the given client device. However, in implementations where the given client device includes a display, the response and/or the notification may be provided for audible presentation to the user via the microphone(s) of the given client device and/or for visual presentation to the user via the display of the given client device.

By using the techniques described herein, one or more technical advantages can be achieved. As one non-limiting example, the techniques described herein enable the automated assistant leverage the odor data in responding to user requests that request the automated assistant identify an odor in an environment of a given client device, thereby reducing a quantity of user inputs received at the given client device and/or computational resources consumed at the given client device absent these techniques. For instance, absent these techniques, the user may provide terms that are descriptive of the odor (e.g., pungent odor outdoors in the southeastern United States in the spring) in an attempt to identify the odor. However, there are a plethora of odors that may fit the description of the odor, thereby requiring the user to peruse search results in an attempt to identify the odor and/or to further refine the query. In contrast, the techniques described herein enable the automated assistant to sample air and/or gas molecules to accurately identify the odor in a more quick and efficient manner. Further, in this example, term(s) of the request and/or contextual information associated with the given client device may be utilized to restrict a search space of the odors to accurately identify the odor in a more quick and efficient manner. As another non-limiting example, the techniques described herein enable the automated assistant to identify presence of odors that are not typically present in the environment of the given client device and/or in instances where the detected odor may be harmful or pose a threat to the user, thereby increasing safety to the user and the environment of the user.

The above description is provided as an overview of only some implementations disclosed herein. Those implementations, and other implementations, are described in additional detail herein.

It should be understood that techniques disclosed herein can be implemented locally on a client device, remotely by server(s) connected to the client device via one or more networks, and/or both.

BRIEF DESCRIPTION OF THE DRAWINGS

FIG. 2 depicts a flowchart illustrating an example method of identifying an odor in an environment of a client device in response to receiving a request to identify the odor, in accordance with various implementations.

DETAILED DESCRIPTION

Figure 1:
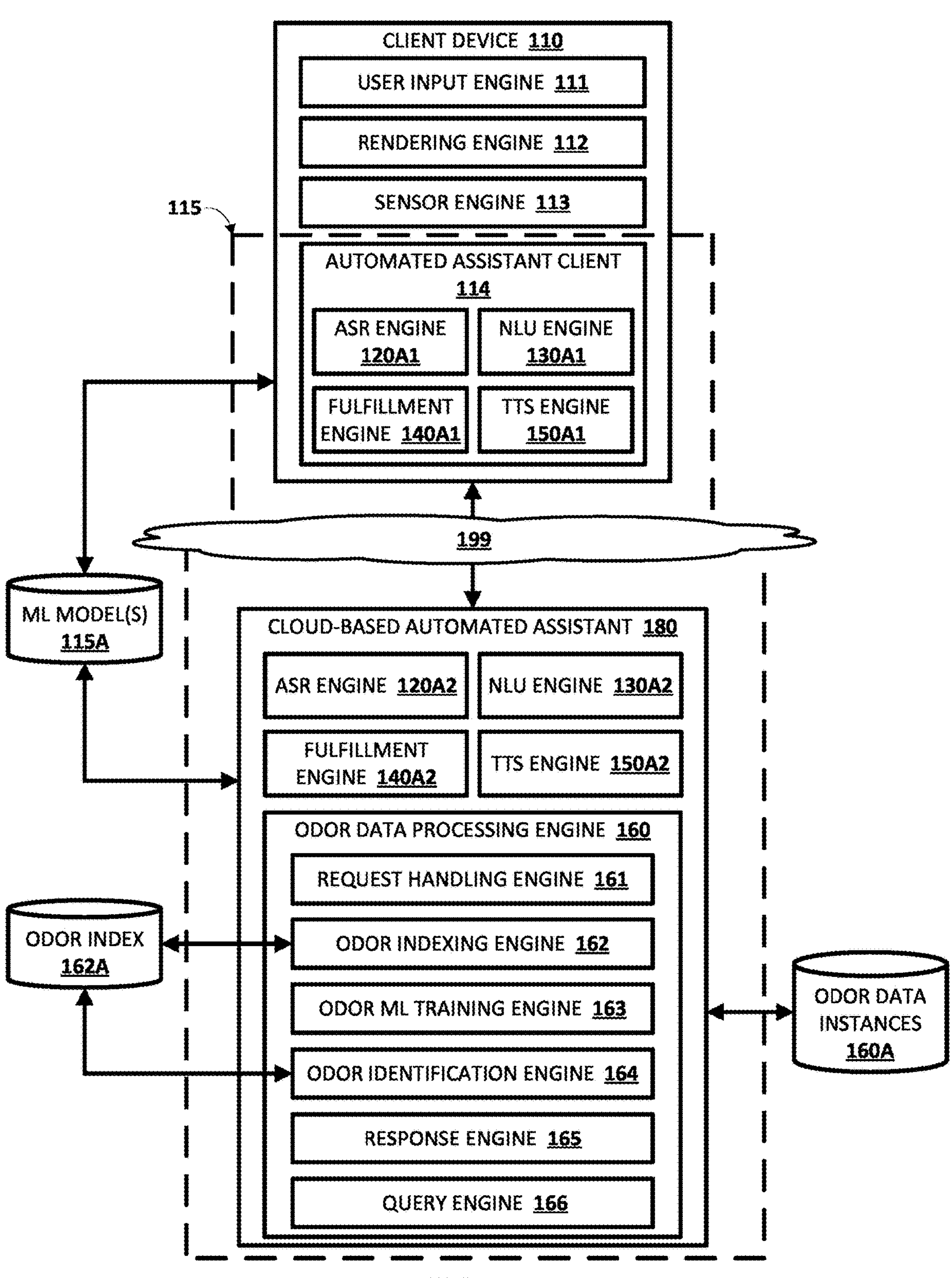
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. The example environment includes a client device 110. The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can include various components, including, but not limited to, a user input engine 111, a rendering engine 112, a sensor engine 113, and an automated assistant client 114. The automated assistant client 114 can include various components, including, but not limited to, an automatic speech recognition (ASR) engine 120A1, a natural language understanding (NLU) engine 130A1, a fulfillment engine 140A1, and a text-to-speech (TTS) engine 150A1. Further, the automated assistant client 114 can be an application that is separate from an operating system of the client device 110 (e.g., installed "on top" of the operating system)—or can alternatively be implemented directly by the operating system of the client device 110. The automated assistant client 114 can interact with a cloud-based automated assistant 180 (e.g., a remote server or cluster of remote servers) over one or more networks 199, such as one or more wired or wireless local area networks ("LANs," including Wi-Fi LANs, mesh networks, Bluetooth, near-field communication, etc.) or wide area networks ("WANs", including the Internet). The cloud-based automated assistant 180 can include various components, including, but not limited to, an ASR engine 120A2, an NLU engine 130A2, a fulfillment engine 140A2, a TTS engine 150A2, and an odor data processing engine 160. Although the odor data processing engine 160 is depicted as being implemented remotely from the client device 110 in FIG. 1, it should be understood that is for the sake of example and is not meant to be limiting, and that the odor data processing engine 160 can be implemented locally at the client device 110 without interacting with the cloud-based automated assistant 180.

The automated assistant client 114 (and optionally by way of its interactions with the cloud-based automated assistant 180) may form what appears to be, from a user's perspective, a logical instance of an automated assistant 115 with which a user of the client device 110 may engage in a human-to-computer dialog. An instance of the automated assistant 115 is depicted in FIG. 1, and is encompassed by a dashed line that includes the automated assistant client 114 of the client device 110 and the cloud-based automated assistant 180. It thus should be understood that a user that engages with the automated assistant client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 114 executing locally on the client device 110 and/or one or more remote servers that may implement the collaborative ranking system 180.

In various implementations, the user input engine 111 is configured to detect user input provided by the user of the client device 110 using one or more user interface input devices. For example, the client device 110 may be equipped with one or more microphones that capture audio data, such as audio data corresponding to spoken utterances of the user or other sounds in an environment of the client device 110. Additionally, or alternatively, the client device 110 may be equipped with one or more vision components that are configured to capture vision data corresponding to images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more software or hardware buttons, etc.) that are configured to capture signal(s) corresponding to touch input and/or typed input directed to the client device 110.

In various implementations, the rendering engine 112 is configured to provide content for audible and/or visual presentation to a user of the client device 110 using one or more user interface output devices. For example, the client device 110 may be equipped with one or more speakers that enable content to be audibly rendered for presentation to the user via the client device 110. Additionally, or alternatively, the client device 110 may be equipped with a display or projector that enables content to be visually rendered presentation to the user via the client device 110.

In various implementations, the sensor engine 113 is configured to obtain sensor data instances from various sensors of the client device. The sensors of the client device 110 can include, but are not limited to, presence sensor(s) that are configured to provide, with approval from corresponding user(s), signals indicative of detected presence, particularly human presence in an environment of the client device 110, odor sensor(s) that are configured to provide signals indicative of air or gas molecules detected in the environment of the client device 110, and/or any other sensors.

In some of those implementations, the automated assistant 115 can identify the client device 110 (or another computing device associated with a user of the client device 110) to satisfy a spoken utterance based at least in part of presence of the user at the client device 110. The spoken utterance can be satisfied by rendering responsive content (e.g., via the rendering engine 112) at the client device 110 by causing the client device 110 to be controlled, and/or by causing the client device 110 to perform any other action to satisfy the spoken utterance. As described herein, the automated assistant 115 can leverage data obtained by the sensor engine 113 in determining the client device 110 to be utilized in satisfying the spoken utterance based on where a user is near or was recently near, and provide corresponding commands to only the client device 110. In some additional or alternative implementations, the automated assistant 115 can leverage data obtained by the sensor engine 113 in determining whether any user(s) (any users or specific users) are currently proximal to the client device 110, and can optionally suppress provision of data to and/or from the client device 110 based on the user(s) that are proximal to the client device 110.

The sensors of the client device 110 from which the sensor engine 113 obtains sensor data instances may come in various forms. For example, the client device 110 can utilize one or more of the user interface input components described above with respect to the user input engine 111 to detect presence of the user. Additionally, or alternatively, the client device 110 may be equipped with other types of light-based presence sensors, such as passive infrared ("PIR") sensors that measure infrared ("IR") light radiating from objects within their fields of view.

Additionally, or alternatively, in some implementations, the presence sensors may be configured to detect other phenomena associated with human presence or device presence. For example, in some implementations, the client device 110 may be equipped with one or more presence sensors that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the client device 110. In other implementations, other wireless signal characteristics, such as time-of-flight, signal strength, etc., may be used by the client device 110, alone or collectively, to determine a particular person's location based on signals emitted by the other computing device(s) carried/operated by the user.

Additionally, or alternatively, in some implementations, the client device 110 may perform speaker identification (SID) to recognize a user from their voice and/or may perform face identification (FID) to recognize a user from vision data capturing his/her face. In some implementations, movement of the speaker may then be determined, e.g., by the presence sensors of the client device 110 (and optionally GPS sensors, Soli chips, and/or accelerometers of the client device 110). In some implementations, based on such detected movement, a location of the user may be predicted, and this location may be assumed to be the user's location when any content to be rendered at the client device 110 and/or other computing device(s) based at least in part on proximity of the client device 110 and/or other computing device(s) to the user's location. In some implementations, the user may simply be assumed to be in the last location at which he/she engaged with the automated assistant 115, especially if not much time has passed since the last engagement.

Also, for example, in some implementations, the client device 110 may be equipped with one or more odor sensors that detect air and/or gas molecules in an environment of the client device 110. The air and/or gas molecules may be absorbed into one or more organic layers of the one or more odor sensors to generate signal(s) corresponding to an odor data instance based on the absorption of the air and/or gas molecules. The odor data instance may be further processed (e.g., by the odor data processing engine 160) to identify an odor and/or a source of the odor. Although a particular odor sensor is described herein, it should be understood that is for the sake of example and is not meant to be limiting, and that any odor sensor integrated with the client device 110 and/or in communication with the client device may be utilized to generate the odor data instances described herein.

Further, the client device 110 and/or the cloud-based automated assistant 180 may include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199. The operations performed by the client device 110, other computing device(s), and/or by the automated assistant 115 may be distributed across multiple computer systems. The automated assistant 115 may be implemented as, for example, computer programs running on the client device 110 and/or one or more computers in one or more locations that are coupled to each other through a network (e.g., the network(s) 199 of FIG. 1).

In some implementations, the operations performed by the automated assistant 115 may be implemented locally at the client device 110 via the automated assistant client 114, whereas in other implementations, the operations performed by the automated assistant 115 may be distributed across multiple computer systems, such as when the cloud-based automated assistant 180 is utilized as depicted in FIG. 1. Notably, the automated assistant client 114 and/or the cloud-based automated assistant 180 may leverage respective instances of the ASR engine 120A1 and/or 120A2, NLU engine 130A1 and/or 130A2, fulfillment engine 140A1 and/or 140A2, and TTS engine 150A1 and/or 150A2 in processing and responding to any user requests detected at the client device (e.g., via the user input engine 111).

Each of these engines may be configured to perform one or more functions. For example, the ASR engine 120A1 and/or 120A2 can process, using ASR model(s) stored in machine learning (ML) model(s) database 115A (e.g., a recurrent neural network (RNN) model, a transformer model, and/or any other type of ML model capable of performing ASR), audio data that captures a spoken utterance and that is generated by microphone(s) of the client device 110 to generate ASR output. Further, the NLU engine 130A1 and/or 130A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based rule(s), the ASR output to generate NLU output. Moreover, the fulfillment engine 140A1 and/or 140A2 can generate fulfillment output(s) based on fulfillment data generated based on the NLU output. The fulfillment data can be generated using, for example, the automated assistant 115, one or more first-party (1P) agents (not depicted), and/or one or more third-party (3P) agents (not depicted). Lastly, the TTS engine 150A1 and/or 150A2 can process, using TTS model(s) stored in the ML model(s) database 115A, textual data (e.g., text formulated by the automated assistant 115) to generate synthesized speech audio data that includes computer-generated synthesized speech. Notably, the ML model(s) stored in the ML model(s) database 115A can be on-device ML models that are stored locally at the client device 110 or shared ML models that are accessible to both the automated assistant client 114 and/or the cloud-based automated assistant 180.

In various implementations, the ASR output can include, for example, speech hypotheses (e.g., term hypotheses and/or transcription hypotheses) that are predicted to correspond to spoken utterance(s) of a user that are captured in the audio data, one or more corresponding predicted values (e.g., probabilities, log likelihoods, and/or other values) for each of the speech hypotheses, a plurality of phonemes that are predicted to correspond to spoken utterance(s) of a user that are captured in the audio data, and/or other ASR output. In some versions of those implementations, the ASR engine 120A1 and/or 120A2 can select one or more of the speech hypotheses as recognized text that corresponds to the spoken utterance (e.g., based on the corresponding predicted values).

In various implementations, the NLU output can include, for example, annotated recognized text that includes one or more annotations of the recognized text for one or more (e.g., all) of the terms of the recognized text. For example, the NLU engine 130A1 and/or 130A2 may include a part of speech tagger (not depicted) configured to annotate terms with their grammatical roles. Additionally, or alternatively, the NLU engine 130A1 and/or 130A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 130A1 and/or 130A2 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 130A1 and/or 130A2 may rely on annotations from one or more other components of the NLU engine 130A1 and/or 130A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

In some implementations, the odor data processing engine 160 can include various components. For example, as shown in FIG. 1, the odor data processing engine 160 can include one or more of a request handling engine 161, an odor index engine 162, an odor ML training engine 163, an odor identification engine 164, a response engine 165, and a query engine 166. Although the odor data processing engine 160 is depicted in FIG. 1 as including particular engines, it should be understood that is for the sake of example and is not meant to be limiting. One or more engines may be omitted, and/or added.

In various implementations, the request handling engine 161 can cause user input from a user of the client device 110 detected via the user input engine 111 to be processed. For example, assume a user of the client device 110 provides a spoken utterance that requests the automated assistant 115 identify an odor in an environment of the client device 110. In this example, the request handling engine 161 can cause audio data that captures the spoken utterance to be processed by the ASR engine 120A1 and/or 120A2 to generate ASR output for the spoken utterance, and cause the ASR output to be processed by the NLU engine 130A1 and/or 130A2 to generate NLU output for the spoken utterance that indicates the user is requesting identification of an odor in the environment of the client device 110. Notably, the request handling engine 161 can identify one or more terms included in the request. As described below (e.g., with respect to the odor identification engine 163), the odor data processing engine 160 can utilize one or more terms of the request to restrict a search space of odors to identify an odor in an environment of the client device 110. Although the above example is described with respect to a request for the automated assistant 115 to identify an odor in an environment of the client device 110, it should be understood that is for the sake of example and is not meant to be limiting, and that the request handling engine 161 can be utilized to process any requests directed to the automated assistant (e.g., with one non-limiting example being described with respect to FIG. 5A).

In various implementations, the odor index engine 162 can generate an odor index 162A based on processing odor data instances stored in an odor data instances database 160A. The odor data instances database 160A can include a plurality of odor data instances generated by one or more of the odor sensors of the client device 110 via the sensor engine 113 and/or generated by one or more additional odor sensors that are standalone or that are integral with one or more additional computing devices. Further, the odor data instances database 160A can include a corresponding label that identifies a corresponding odor (e.g., a chemical compound that identifies the odor) associated with each of the plurality of odor data instances, one or more characteristics that describe the corresponding odors (e.g., sweet, pungent, etc.), and/or one or more sources of the corresponding odors (e.g., faulty plumbing, a particular flower or tree, mold, various medical ailments, etc.). The odor indexing engine 162 can generate the odor index 152A by generating a mapping between each of the corresponding data instances and the corresponding labels, the one or more characteristics, and/or the one or more sources. The mapping may be subsequently utilized (e.g., by the odor identification engine 164) to identify an odor detected in an environment of the client device 110, one or more characteristics associated with the odor detected in the environment of the client device 110, and/or one or more sources of the odor detected in the environment of the client device 110.

In some versions of those implementations, the odor index 162A may be indexed based on one or more criteria. The one or more criteria may include, for example, the corresponding labels that identifies a corresponding odor, the one or more characteristics that describe the corresponding odors, the one or more sources of the corresponding odors, geographical regions associated with the corresponding odors, times of year associated with the corresponding odors, whether the corresponding odors are encountered indoors or outdoors, and/or any other criteria. The one or more criteria may be subsequently utilized (e.g., by the odor identification engine 164) to quickly and efficiently traverse the mapping between the corresponding odor data instances and the corresponding odors (or other data associated with the corresponding odors such as the corresponding labels, the one or more corresponding characteristics, the one or more sources, etc.) by restricting a search space of the odors based on one or more terms included in a request corresponding to one or more of the characteristics (e.g., identified by the request handling engine 161 as noted above) and/or based on contextual information associated with the client device 110 corresponding to contextual information associated with the odors (e.g., a location at which the odor is typically present, a time of year during which the odor is typically present, etc.).

In various implementations, the odor ML training engine 163 can generate a plurality of training instances based on the corresponding odor data instances (and other data associated with the corresponding odors) stored in the odor data instances database 160. Each of the plurality of training instances can include training instance input and training instance output. The training instance input for a given training instance can include, for example, a given odor data instance (e.g., from among the plurality of corresponding odor data instances stored in the data instances database 160) and/or one or more of the characteristics associated with the given odor data instance. Further, the training instance output can include, for example, one or more of the labels associated with the given odor data instance and/or one or more of the sources associated with the given odor data instance.

Further, the odor ML training engine 163 can train an odor ML model stored in the ML model(s) database 115A based on the plurality of training instances. The odor ML model may be any suitable ML model that is capable of processing the corresponding given odor data instances and/or one or more of the characteristics associated with the corresponding odor data instances to predict one or more of the labels associated with the corresponding odor data instances and/or one or more of the sources of the corresponding odors associated with the corresponding odor data instances, such as an encoder-decoder network. The encoder-decoder network may be utilized to map the corresponding odors to an embedding space or other lower-level space that enables the corresponding odor data instances to be compared to odor data instances generated by the one or more odor data sensors of the client device 110.

For example, in training the odor ML model based on a given training instance, the training instance input can be applied as input across the odor ML model to generate an embedding for the given odor data instance. The embedding for the given odor data instance can be mapped to the embedding space and labeled with one or more of the labels associated with the given odor data instance and/or one or more of the sources associated with the given odor data instance included in the training instance output. This process may be repeated for each of the plurality of training instances to populate the embedding space. Further, the embedding space may be distributed based on one or more of the characteristics included in the training instance input. Put another way, sweet odors may be mapped to a first portion of the embedding space, pungent odors may be mapped to a second portion of the embedding space, and so on. This enables similar odors to be grouped together in the embedding space. The odor ML model may be trained based on additional training instances to add corresponding odors to the embedding space.

In various implementations, the odor identification engine 164 can utilize the odor index 162A that was previously generated (e.g., as described with respect to the odor index engine 162) and/or the odor ML model stored in the ML model(s) database 115A (e.g., trained as described with respect to the odor ML training engine) to identify odors based on odor data instances generated by one or more of the odor sensors of the client device 110. For example, in implementations where the odor identification engine 164 utilizes the odor index 162A to identify a given odor, the odor identification engine 164 can compare a given odor data instance to the plurality of corresponding data instances stored in the odor index 162A to identify a given odor captured by the given odor data instance. For instance, the odor identification engine 164 can compare raw odor data of the given odor data instance to corresponding raw odor data of the corresponding odor data instances that were previously indexed to identify the given odor and/or compare any representation of the raw odor data of the given odor data instance any available representation of the corresponding odor data instances that were previously indexed to identify the given odor. In this example, the odor identification engine 164 can generate output based on the given odor that is identified from the odor index 162A. The output can include an indication of a predicted odor that is predicted to be present in the environment of the client device 110, one or more of the sources that are predicted to be emitting the predicted odor, visual content and/or audible content associated with the predicted odor and/or one or more of the sources, and/or other information.

Also, for example, in implementations where the odor identification 164 utilizes the odor ML model to identify a given odor, the odor identification engine 164 can process a given odor data instance that captures a given odor using the odor ML model to generate a given odor embedding. The given odor embedding can be compared, in the embedding space, to previously generated odor embeddings (e.g., as described above with respect to the odor ML training engine 163). For instance, a distance in the embedding space between the given odor embedding and the previously generated odor embeddings may be determined, and a given odor associated with the previously generated odor embedding that is closest to the given odor embedding can be identified as the given odor captured in the given odor data instance. Further, one or more terms of a request to identify the given odor can additionally or alternatively be processed using the odor ML model to restrict portions of the embedding space that may be compared to the given odor data instance. For instance, if the user includes a term of "sweet" in describing the given odor in providing the request, then the odor identification engine 164 may restrict the comparing of the given odor embedding to the previously generated odor embeddings that are associated with "sweet" odors. Similarly, the output can include an indication of a predicted odor that is predicted to be present in the environment of the client device 110, one or more of the sources that are predicted to be emitting the predicted odor, visual content associated with the predicted odor and/or one or more of the sources, and/or other information.

In various implementations, the response engine 165 can process the output generated by the odor identification engine 164 to generate a response that identifies at least the given odor captured in the given odor data instance. In some implementations, the response engine 165 can determine visual content to be provided for presentation to a user. In some versions of those implementations, the visual content may be visually rendered (e.g., via the rendering engine 112) for presentation to the user via a display of the client device 110. The visual content can include, for example, one or more textual segments that include the given odor or one or more of the sources of the given odor, information cards related to the given odor or one or more of the sources of the given odor, and/or other visual content. In additional or alternative implementations, the response engine 165 can determine audible content to be provided for presentation to a user. In some versions of those implementations, the audible content may be generated using the TTS engine 150A1 and/or 150A2, and can be audibly rendered (e.g., via the rendering engine 112) for presentation to the user via one or more speakers of the client device 110.

In various implementations, the query engine 166 can generate a query based on the output generated by the odor identification engine 164 and/or based on the response generated by the response engine 165. Based on the query, a search may be executed over one or more databases to obtain content that is responsive to the query. For example, assume the given odor identified in response to a request corresponds to linear polyamine compounds caused by a dogwood tree in an environment of the client device 110. In this example, a query for a dogwood tree can be generated and submitted to a search engine to obtain an information card for the dogwood tree, and the information card can be provided for presentation to the user. In additional or alternative implementations, the query engine 166 can generate a query based on further user input. For example, assume the given odor identified in response to a request corresponds to microbial volatile organic compounds caused by black mold in an environment of the client device 110. In this example, a query for a mold specialist can be generated and submitted to a search engine to obtain an information card that includes mold specialist capable of ridding the environment of the client device of the black mold, and the information card can be provided for presentation to the user.

Turning now to FIG. 2, a flowchart illustrating an example method 200 of identifying an odor in an environment of a client device in response to receiving a request to identify the odor is depicted. For convenience, the operations of the method 200 are described with reference to a system that performs the operations. This system of the method 200 includes one or more processors, memory, and/or other component(s) of computing device(s) (e.g., client device 110 of FIG. 1, computing device 610 of FIG. 6, one or more servers, and/or other computing devices). Moreover, while operations of the method 200 are shown in a particular order, this is not meant to be limiting. One or more operations may be reordered, omitted, and/or added.

At block 252, the system receives, from a user, a request to identify an odor in an environment of a client device of the user. At block 254, the system obtains an odor data instance generated by one or more odor sensors of the client device of the user. The request may include one or more terms and may be received via a spoken utterance, typed input, and/or touch input. Further, the odor data instance may be generated in response to receiving the request from the user.

At block 256, the system processes the odor data instance generated by the one or more odor sensors to generate output. The output can include, for example, an indication of a predicted odor that is predicted to be present in the environment of the client device, one or more of the sources that are predicted to be emitting the predicted odor, visual content and/or audible content associated with the predicted odor and/or one or more of the sources, and/or other information. For example, in some implementations, and as indicated at block 256A, the system may utilize a previously generated index that maps corresponding odor data instances to corresponding odors to generate the output. The system can previously generate the odor index that maps corresponding odor data instances to corresponding odors in one or more of the manners described herein (e.g., with respect to the odor indexing engine 162 and the odor index 162A of FIG. 1) and/or in other manners. For instance, the system can compare the odor data instance to the corresponding odor data instances that were previously indexed to identify the predicted odor that is predicted to correspond to the odor captured by the odor data instance, and the system can generate the output based on the predicted odor that is predicted to correspond to the odor captured by the odor data instance.

As another example, in additional or alternative implementations, and as indicated block 256B, the system utilizes an odor machine learning (ML) model to generate the output. The system can previously train the odor ML model in one or more of the manners described herein (e.g., with respect to the odor ML training engine 163 of FIG. 1) and/or in other manners. For instance, the system can apply the odor data instance as input across the odor ML model to generate an odor embedding and map the odor embedding to an embedding space, and the system can generate the output based on comparing the odor embedding to previously generated odor embeddings in the embedding space.

At block 258, the system identifies, based on the output, the odor in the environment of the client device of the user. For example, in some implementations, and as indicated at block 258A, the system utilizes contextual information associated with the client device to identify the odor based on the output. In implementations where the system utilizes the odor index to generate the output, the system may restrict the corresponding odor data instances considered to those that occur in similar contextual scenarios. For instance, assume a user is indoors during the winter as indicated by contextual information associated with the client device and assume the user provides a request to identify an odor in the environment of the client device. In this instance, the system may not consider corresponding odor data instances associated with odors that are typically present outdoors during the spring, such as blooming flowers or trees. In implementations where the system utilizes the odor ML model to generate the output, the contextual information may additionally be applied as input across the odor ML model in generating the odor embedding. For instance, again assume a user is indoors during the winter as indicated by contextual information associated with the client device and again assume the user provides a request to identify an odor in the environment of the client device. In this instance, the system may additionally process the locational and seasonal information in generating the odor embedding to influence where the odor embedding is mapped in the embedding space (e.g., towards odors that occur in similar contextual scenarios).

As another example, in additional or alternative implementations, and as indicated block 258B, the system utilizes one or more terms of the request (e.g., that was received at block 252) to identify the odor based on the output. In implementations where the system utilizes the odor index to generate the output, the system may restrict the corresponding odor data instances considered to those that are associated with characteristics described by one or more of the terms or phrases. For instance, again assume a user is indoors during the winter as indicated by contextual information associated with the client device and assume the user provides a request to identify a "sweet" odor in the environment of the client device. In this instance, the system may not consider corresponding odor data instances associated with characteristics indicating the corresponding odor data instances are associated with odors that are pungent, damp, fishy, rancid, etc. In implementations where the system utilizes the odor ML model to generate the output, one or more of the terms may additionally be applied as input across the odor ML model in generating the odor embedding. For instance, again assume a user is indoors during the winter as indicated by contextual information associated with the client device and again assume the user provides a request to identify a "sweet" odor in the environment of the client device. In this instance, the system may additionally process the term "sweet" in generating the odor embedding to influence where the odor embedding is mapped in the embedding space (e.g., towards odors that are considered "sweet").

At block 260, the system generates a response to the request that identifies at least the odor in the environment of the client device of the user. At block 262, the system causes the response to the request to be provided for presentation to the user via the client device. The response can identify, for example, the odor, one or more of the sources that are predicted to be emitting the odor, visual content and/or audible content associated with the predicted odor and/or one or more of the sources, and/or other information. In some implementations, the information included in the response may be obtained while generating the output at block 256 and/or while identifying the odor at block 258. In additional or alternative implementations, the system may generate a query based on the output to obtain the information included in the response (e.g., as described with respect to the query engine 166 of FIG. 1). The response may be audibly rendered and/or visually rendered for presentation to the user.

Figure 3:
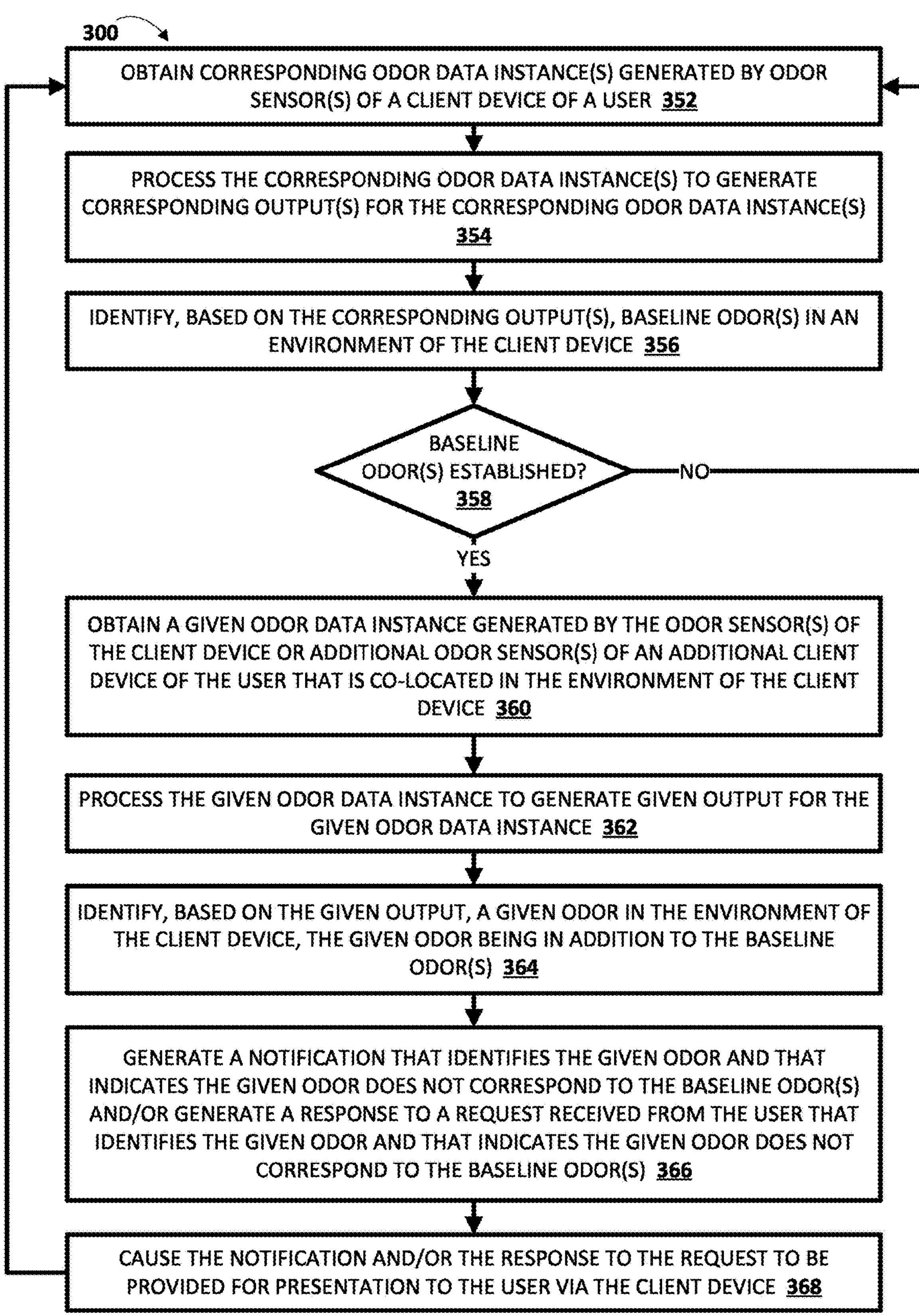
FIG. 3 depicts a flowchart illustrating an example method of establishing one or more baseline odors in an environment of a client device and identifying a given odor in the environment of the client device that is in addition to the one or more baseline odors, in accordance with various implementations.

Turning now to FIG. 3, a flowchart illustrating an example method 300 of establishing one or more baseline odors in an environment of a client device and identifying a given odor in the environment of the client device that is in addition to the one or more baseline odors is depicted. For convenience, the operations of the method 300 are described with reference to a system that performs the operations. This system of the method 300 includes one or more processors, memory, and/or other component(s) of computing device(s) (e.g., client device 110 of FIG. 1, computing device 610 of FIG. 6, one or more servers, and/or other computing devices). Moreover, while operations of the method 300 are shown in a particular order, this is not meant to be limiting. One or more operations may be reordered, omitted, and/or added.

At block 352, the system obtains one or more corresponding odor data instances generated by one or more odor sensors of a client device of a user. The one or more corresponding odor data instances may be obtained at block 352 a plurality of disparate time instances across a time interval. At block 354, the system processes one or more of the corresponding odor data instances to generate one or more corresponding outputs for one or more of the corresponding odor data instances. The system can process one or more of the corresponding odor data instances to generate one or more of the corresponding outputs for one or more of the corresponding odor data instances in the same or similar described with respect to the operations of block 256 of the method 200 of FIG. 2. At block 356, the system identifies, based on one or more of the corresponding outputs, one or more baseline odors in an environment of the client device. The system can identify one or more corresponding odors based on one or more of the corresponding outputs in the same or similar described with respect to the operations of block 258 of the method 200 of FIG. 2. Further, the system can classify one or more of the corresponding odors as a baseline odor in response to determining that that the odor is identified in the environment of the client device for a threshold quantity of the time instances across the time interval.

At block 358, the system determines whether one or more of the baseline odors have been established. If, at an iteration of block 358, the system determines that one or more of the baseline odors have not been established, then the system returns to block 352 and repeats the operations of blocks 352-358 with respect to one or more additional corresponding odor data instances. If, at an iteration of block 358, the system determines that one or more of the baseline odors have been established, then the system proceeds to block 360. Any odors that correspond to one or more of the baseline odors may be annotated as such (e.g., in the odor index 162A of FIG. 1). For instance, assume that a pumpkin scented candle is present in an environment of the client device and an odor capturing the pumpkin scented candle is captured in six corresponding odor data instances. In this instance, and assuming that six satisfies the threshold quantity of time instances across the time interval, the pumpkin scented candle may be established as a baseline odor in the environment of the client device. However, and assuming that six does not satisfy the threshold quantity of time instances across the time interval, the pumpkin scented candle may not be established as a baseline odor in the environment of the client device.

At block 360, the system obtains a given odor data instance generated by one or more of the odor sensors of the client device or one or more additional odor sensors of an additional client device of the user that is co-located in the environment of the client device. The given odor data instances may be obtained at block 360 a subsequent time instance that is subsequent to the plurality of time instances at which one or more of the corresponding odor data instances and/or one or more of the additional corresponding odor data instances are obtained at one or more iterations of block 352. In some implementations, the given odor data instance may be obtained periodically to detect the presence of one or more odors that are not typically present in the environment of the client device and/or that belong to a category of odors that may be harmful to the user. In additional or alternative implementations, the given odor data instance may be obtained in response to receiving a request from the user to identify a given odor in the environment of the client device and/or the additional client device (e.g., as described with the respect to the method 200 of FIG. 2).

At block 362, the system processes the given odor data instance to generate given output for the given odor data instance. The system can process the given odor data instance to generate the output for the given odor data instance in the same or similar described with respect to the operations of block 256 of the method 200 of FIG. 2. At block 364, the system identifies, based on the given output, a given odor in the environment of the client device, the given odor being in addition to one or more of the baseline odors. The system can identify the given odor based on the output in the same or similar described with respect to the operations of block 258 of the method 200 of FIG. 2.

At block 366, the system generates a notification that identifies the given odor that identifies the given odor and that indicates the given odor does not correspond to one or more of the baseline odors (e.g., in implementations where the given odor data instance is obtained periodically) and/or generates a response to a request received from the user that identifies the given odor and that indicates the given odor does not correspond to one or more of the baseline odors (e.g., in implementations where the given odor data instance is obtained in response to a request). At block 368, the system causes the notification and/or the response to the request to be provided for presentation to the user via the client device. In some implementations, the system may generate the notification in response to determining that the given odor may pose a harm or threat to the user of the client device. In some implementations, the system may generate the notification in response to determining that the given odor is associated with a pecuniary interest (e.g., an advertisement). The response may be audibly rendered and/or visually rendered for presentation to the user.

Figure 4A:
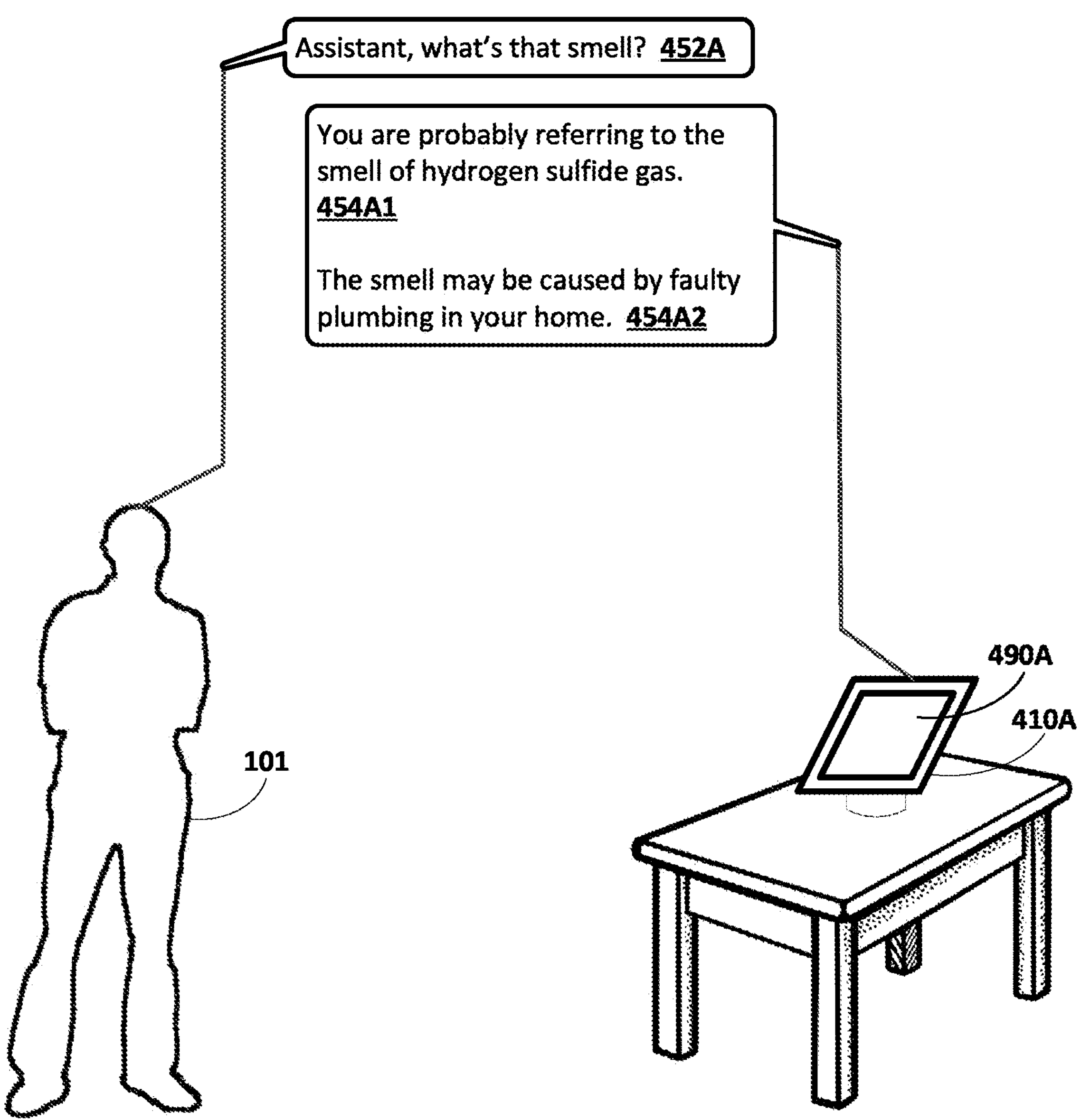
FIG. 4A and FIG. 4B depict various non-limiting examples associated with identifying an odor in an environment of a client device in response to receiving a request to identify the odor, in accordance with various implementations.
Figure 4B:
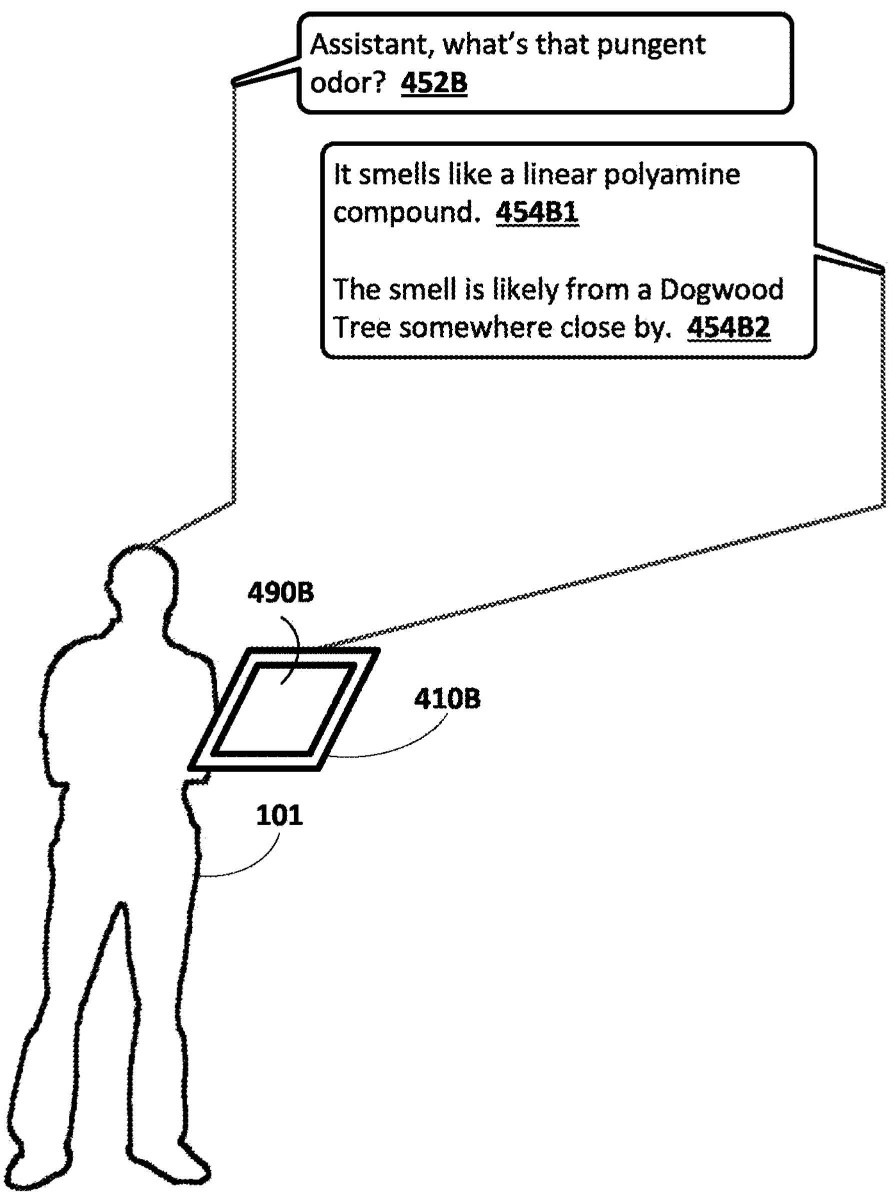

Turning now to FIGS. 4A and 4B, various non-limiting examples associated with identifying an odor in an environment of a client device in response to receiving a request to identify the odor are depicted. An automated assistant can be implemented at least in part at client devices 490A and 490B depicted in FIGS. 4A and 4B (e.g., the automated assistant 115 described with respect to FIG. 1). The automated assistant can utilize an odor processing engine (e.g., the odor processing system 160 described with respect to FIG. 1) to identify odors in environments of the client devices 410A and 410B. The client devices 410A and 410B depicted in FIGS. 4A and 4B may include various user interface components including, for example, microphone(s) to generate audio data based on spoken utterances and/or other audible input, speaker(s) to audibly render synthesized speech and/or other audible output, and a display to receive touch input and/or to visually render transcriptions and/or other visual output. Although the client devices 410A and 410B depicted in FIGS. 4A and 4B are a standalone interactive speaker having a display 490A and a tablet having a display 490B, respectively, it should be understood that is for the sake of example and is not meant to be limiting.

Referring specifically to FIG. 4A, assume a user 101 of the client device 410A provides a spoken utterance 452A of "Assistant, what's that smell?" The automated assistant can process audio data capturing the spoken utterance 452A using an ASR engine (e.g., the ASR engine 120A1 and/or 120A2 of FIG. 1) to generate ASR output (e.g., speech hypothes(es) predicted to correspond to the spoken utterance 452A). In some implementations, the automated assistant processes the audio data capturing the spoken utterance 452A in response to determining that the spoken utterance 452A includes one or more particular words or phrases to invoke the automated assistant (e.g., "Assistant", "Hey Assistant", etc.). Further, the automated assistant can process the ASR output using an NLU engine (e.g., the NLU engine 130A1 and/or 130A2 of FIG. 1) to generate NLU output. Based on the NLU output, the automated assistant can determine that the spoken utterance 452A corresponds to a request to identify an odor in an environment of the client device 410A.

For the sake of the example of FIG. 4A, further assume that the client device 410A is located in a primary dwelling of the user 101 (e.g., determined based on the client device 410A being assigned to the primary dwelling of the user 101 in a device topology representation of smart devices of the user 101). In response to receiving the spoken utterance 452A, one or more odor sensors of the client device 410A can generate an odor data instance. The automated assistant can cause the odor data instance to be processed to generate output, and identify an odor present in the environment of the client device 410A based on the output. In some implementations, the automated assistant can utilize a previously generated index to process the odor data instance to generate the output (e.g., as described with respect to the odor indexing engine 162 and the odor index 162A of FIG. 1, and with respect to the method 200 of FIG. 2). In additional or alternative implementations, the automated assistant can utilize an odor ML model to generate the output (e.g., as described with respect to the odor ML training engine 163 and the ML model(s) database 115A of FIG. 1, and with respect to the method 200 of FIG. 2).

Notably, in these implementations, the automated assistant may leverage contextual information associated with the client device 410A in generating the output and/or in identifying the odor. As noted above, in the example of FIG. 4A, the client device 410A is located in the primary dwelling of the user 101. Accordingly, a search space of odors considered in generating the output and/or in identifying the odor may be restricted to those odors which may occur indoors. For the sake of the example of FIG. 4A, further assume that the automated assistant determines that the odor corresponds to hydrogen sulfide gas. In this example, the automated assistant can cause synthesized speech audio data 454A1 of "You are probably referring to the smell of hydrogen sulfide gas" to be audibly rendered for presentation to the user 101. However, many users may not know what hydrogen sulfide gas is or what causes hydrogen sulfide gas to be emitted. Accordingly, in this example, the automated assistant can additionally, or alternatively, cause synthesized speech audio data 454A2 of "the smell may be caused by faulty plumbing in your home" to make the user 101 aware of a possible source of the hydrogen sulfide gas. Notably, in the example of FIG. 4A, the client device 410A includes the display 490A, and content may additionally, or alternatively, be visually rendered for presentation to the user 101 via the display 490A.

In some implementations, the automated assistant may additionally or alternatively identify one or more suggested actions and provide the one or more suggested actions for presentation to the user 101. In the example of FIG. 4A, the automated assistant may identify one or more plumbers in an area of the primary dwelling of the user 101. In some versions of those implementations, the one or more suggested actions may be proactively identified by the automated assistant and provided for presentation to the user 101 (e.g., as an advertisement for a local plumbing company), whereas in other versions of those implementations, the one or more suggested actions may be identified by the automated assistant in response to additional user input that requests the one or more suggested actions (e.g., "can you find me a plumber to fix the faulty plumbing?").

Referring specifically to FIG. 4B, assume the user 101 of the client device 410B provides a spoken utterance 452B of "Assistant, what's that pungent odor?" The automated assistant can process audio data capturing the spoken utterance 452B using an ASR engine to generate ASR output, and can process the ASR output using an NLU engine to generate NLU output in the same or similar manner described above with respect to FIG. 4A. Based on the NLU output, the automated assistant can determine that the spoken utterance 452B corresponds to a request to identify an odor in an environment of the client device 410B, and to specifically identify a "pungent" odor in the environment of the client device 410B.

For the sake of the example of FIG. 4B, further assume that the client device 410B is located outdoors and a time of year corresponds to spring at a location of the client device 410B (e.g., the month of April in the southeastern United States). In response to receiving the spoken utterance 452B, one or more odor sensors of the client device 410A can generate an odor data instance. The automated assistant can cause the odor data instance to be processed to generate output, and identify an odor present in the environment of the client device 410A based on the output. In some implementations, the automated assistant can utilize a previously generated index to process the odor data instance to generate the output (e.g., as described with respect to the odor indexing engine 162 and the odor index 162A of FIG. 1, and with respect to the method 200 of FIG. 2). In additional or alternative implementations, the automated assistant can utilize an odor ML model to generate the output (e.g., as described with respect to the odor ML training engine 163 and the ML model(s) database 115A of FIG. 1, and with respect to the method 200 of FIG. 2).

Notably, in these implementations, the automated assistant may leverage contextual information associated with the client device 410B in generating the output and/or in identifying the odor. As noted above, in the example of FIG. 4B, the client device 410B is located outdoors in the spring in the southeastern United States and the user 101 described the odor as "pungent". Accordingly, a search space of odors considered in generating the output and/or in identifying the odor may be restricted to those odors which may occur outdoors in the spring in the southeastern United States and that have at least a "pungent" characteristic. For the sake of the example of FIG. 4B, further assume that the automated assistant determines that the odor corresponds to a linear polyamine compound. In this example, the automated assistant can cause synthesized speech audio data 454B1 of "It smells like a linear polyamine compound" to be audibly rendered for presentation to the user 101. However, many users may not know what a linear polyamine compound is or what causes a linear polyamine compound to be emitted. Accordingly, in this example, the automated assistant can additionally, or alternatively, cause synthesized speech audio data 454B2 of "the smell is likely from a Dogwood Tree somewhere close by" to make the user 101 aware of a possible source of the linear polyamine compound. Notably, in the example of FIG. 4B, the client device 410B includes the display 490B, and content may additionally, or alternatively, be visually rendered for presentation to the user 101 via the display 490B, such as an information card that includes a picture of a Dogwood Tree and/or one or more facts about Dogwood Trees.

Although FIGS. 4A and 4B are described with respect to the automated assistant identifying odors in response to an explicit request from the user 101, it should be understood that is for the sake of example and is not meant to be limiting. For example, and as described below with respect to FIG. 5A, the automated assistant may proactively notify the user 101 of one or more odors that are detected in the environments of the client devices 410A and 410B. Further, although FIGS. 4A and 4B are described with respect to receiving particular spoken utterances and providing particular responses, it should also be understood that is for the sake of example and is not meant to be limiting. For example, the automated assistant may identify the odors based on one or more of the sources that are predicted to be emitting the odors. Moreover, although FIGS. 4A and 4B are described with respect to particular contextual information associated with the client devices 410A and 410B, it should be understood that is also for the sake of example and is not meant to be limiting.

Figure 5A:
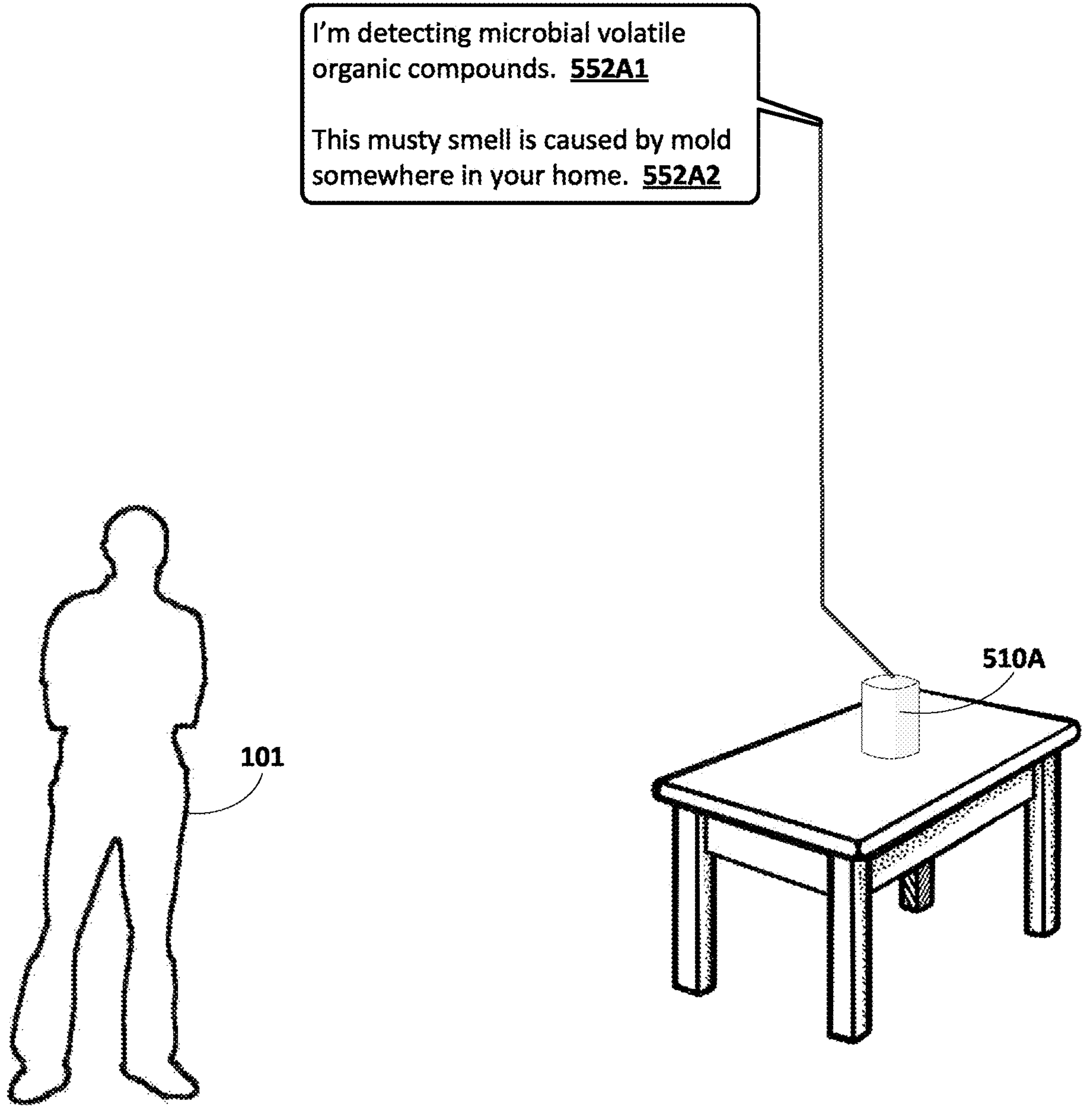
FIG. 5A and FIG. 5B depict various non-limiting examples associated with establishing one or more baseline odors in an environment of a client device and identifying a given odor in the environment of the client device that is in addition to the one or more baseline odors, in accordance with various implementations.
Figure 5B:
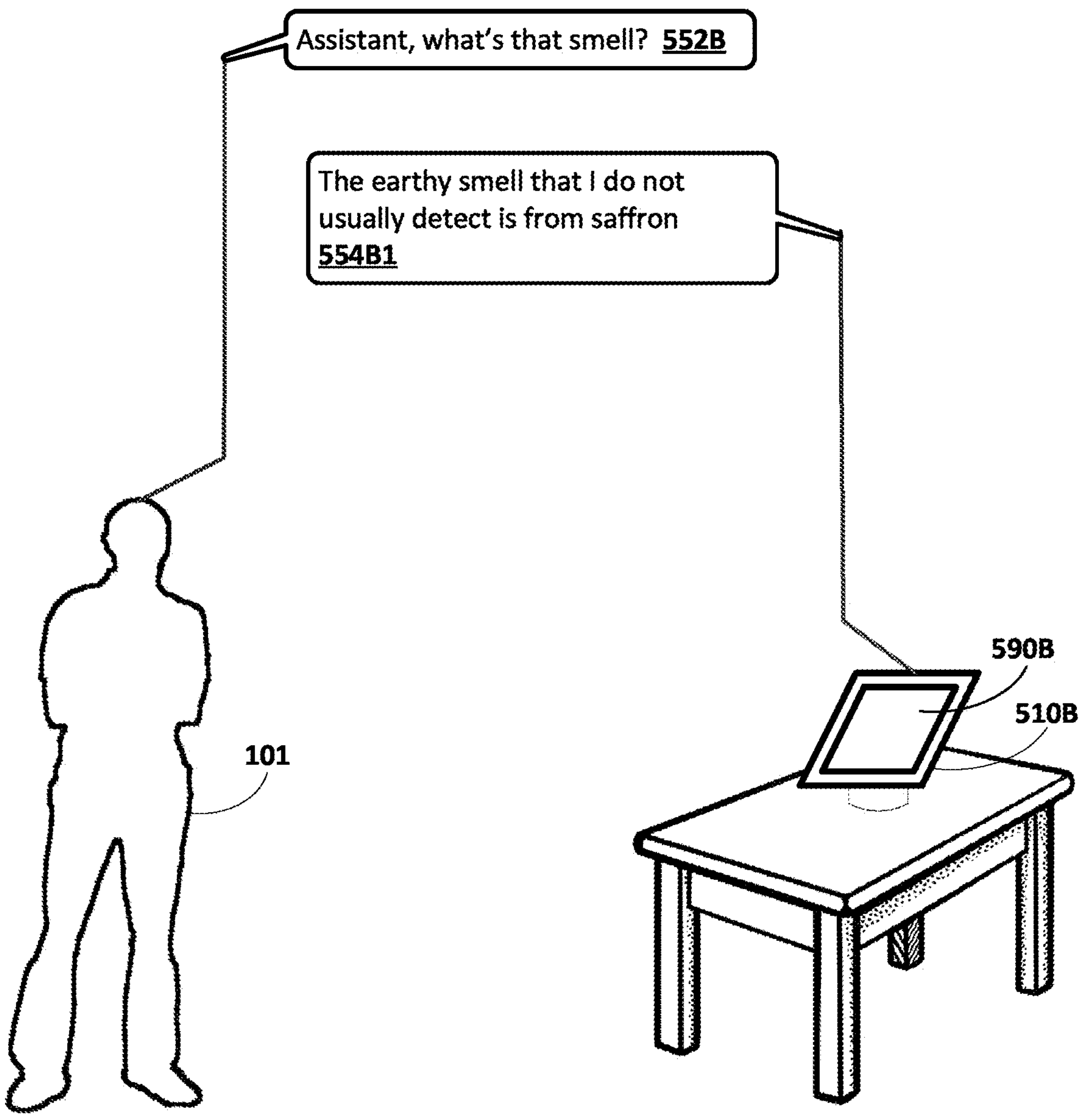

Turning now to FIGS. 5A and 5B, various non-limiting examples associated with establishing one or more baseline odors in an environment of a client device and identifying a given odor in the environment of the client device that is in addition to the one or more baseline odors are depicted. An automated assistant can be implemented at least in part at client devices 510A and 510B depicted in FIGS. 5A and 5B (e.g., the automated assistant 115 described with respect to FIG. 1). The automated assistant can utilize an odor processing engine (e.g., the odor processing system 160 described with respect to FIG. 1) to identify odors in environments of the client devices 510A and 510B. The client devices 510A and 510B depicted in FIGS. 5A and 5B may include various user interface components including, for example, microphone(s) to generate audio data based on spoken utterances and/or other audible input, speaker(s) to audibly render synthesized speech and/or other audible output, and a display to receive touch input and/or to visually render transcriptions and/or other visual output. Although the client devices 510A and 510B depicted in FIGS. 5A and 5B are a standalone interactive speaker lacking a display and a standalone interactive speaker having a display 590B, respectively, it should be understood that is for the sake of example and is not meant to be limiting.

Referring specifically to FIG. 5A, assume the client device 510A is located in a primary dwelling of a user 101 of the client device 510A, and assume the automated assistant has established a plurality of baseline odors for an environment of the client device 510A. For example, the automated assistant can cause one or more odor sensors of the client device 510A to generate a plurality of odor data instances at corresponding time instances across a time interval. For instance, assume the automated assistant obtains and processes odor data instances once a day across a week. In this instance, further assume the automated assistant identifies odors corresponding to a pumpkin scented candle and lavender for a threshold quantity of days. Accordingly, the automated assistant may consider the odors corresponding to the pumpkin scented candle and the lavender as two baseline odors for the primary dwelling of the user 101.

For the sake of the example of FIG. 5A, further assume that the automated assistant causes the one or more odor sensors of the client device 510A to periodically generate odor data instances. Further assume that a given odor data instance is determined to capture an odor corresponding to microbial volatile organic compounds and that a source of microbial volatile organic compounds is black mold. In this example, and in response to identifying the given odor corresponding to microbial volatile organic compounds, the automated assistant can cause synthesized speech audio data 552A1 of "I'm detecting microbial volatile organic compounds" to be audibly rendered for presentation to the user 101. However, many users may not know what microbial volatile organic compounds are or what causes microbial volatile organic compounds to be emitted. Accordingly, in this example, the automated assistant can additionally, or alternatively, cause synthesized speech audio data 552A2 of "this musty smell is caused by mold somewhere in your home" to make the user 101 aware of a possible source of the microbial volatile organic compounds. Notably, in the example of FIG. 5A, the client device 510A does not include the display 490B, but content may additionally, or alternatively, be visually rendered for presentation to the user 101 via a display of an additional client device of the user 101. In some implementations, this notification may be provided for presentation to the user in response to determining that the microbial volatile organic compounds may harm or pose a threat to the user 101, whereas in additional or alternative implementations, this notification may be provided in response to detecting an odor that has not been established as a baseline odor in the environment of the client device 510A. In some implementations, the automated assistant may proactively identify one or more suggested actions, such as providing information with respect to one or more nearby mold specialists based on the detected odor.

Although the example of FIG. 5A is described with respect to establishing one or more of the baseline odors to generate notifications to be provided for presentation to the user 101, it should be understood that is for the sake of example and is not meant to be limiting. For example, the automated assistant may additionally, or alternatively, utilize one or more of the baseline odors in responding to requests received from the user 101. Referring specifically to FIG. 5B, assume the user 101 of the client device 410B provides a spoken utterance 552B of "Assistant, what's that smell?" The automated assistant can process audio data capturing the spoken utterance 552B using an ASR engine to generate ASR output, and can process the ASR output using an NLU engine to generate NLU output in the same or similar manner described above with respect to FIGS. 4A and 4B. Based on the NLU output, the automated assistant can determine that the spoken utterance 552B corresponds to a request to identify an odor in an environment of the client device 510B.

For the sake of the example of FIG. 5B, further assume that the client device 410B is located in a primary dwelling of the user 101, and further assume that a pumpkin scented candle and lavender have been established as two baseline odors for the primary dwelling of the user 101 as described above with respect to FIG. 5A. In response to receiving the spoken utterance 552B, one or more odor sensors of the client device 510B can generate an odor data instance. The automated assistant can cause the odor data instance to be processed to generate output, and identify an odor present in the environment of the client device 510B based on the output. In some implementations, the automated assistant can utilize a previously generated index to process the odor data instance to generate the output (e.g., as described with respect to the odor indexing engine 162 and the odor index 162A of FIG. 1, and with respect to the method 200 of FIG. 2). In additional or alternative implementations, the automated assistant can utilize an odor ML model to generate the output (e.g., as described with respect to the odor ML training engine 163 and the ML model(s) database 115A of FIG. 1, and with respect to the method 200 of FIG. 2).

Notably, in these implementations, the automated assistant may leverage contextual information associated with the client device 410B in generating the output and/or in identifying the odor. As noted above, in the example of FIG. 5B, the client device 510B in the primary dwelling of the user 101. Accordingly, a search space of odors considered in generating the output and/or in identifying the odor may be restricted to those odors which may occur indoors and that exclude the baseline odors. For the sake of the example of FIG. 5B, further assume that the automated assistant determines that the odor corresponds to saffron that is used in cooking. In this example, the automated assistant can cause synthesized speech audio data 554B1 of "the earthy smell that I do not usually detect is from saffron" to be audibly rendered for presentation to the user 101. Notably, in the example of FIG. 5B, the client device 510B includes the display 590B, and content may additionally, or alternatively, be visually rendered for presentation to the user 101 via the display 490B, such as an information card that includes a picture of saffron and/or one or more facts about saffron.

Although FIGS. 5A and 5B are described with respect to receiving particular spoken utterances and providing particular responses and/or notifications, it should also be understood that is for the sake of example and is not meant to be limiting. For example, the automated assistant may identify the odors based on one or more of the sources that are predicted to be emitting the odors. Further, although FIGS. 5A and 5B are described with respect to particular contextual information associated with the client devices 510A and 510B, it should be understood that is also for the sake of example and is not meant to be limiting. Moreover, although FIGS. 5A and 5B are described with respect to particular baseline odors associated with the environments of the client devices 510A and 510B, it should be understood that is also for the sake of example and is not meant to be limiting.

Although the examples of FIGS. 4A, 4B, 5A, and 5B are described with identifying a single odor in the environments of the various client devices, it should be understood that is for the sake of brevity and is not meant to be limiting. For example, in various implementations, multiple odors may be identified based on processing a single odor data instance. In this example, the automated assistant may generate output for each of the multiple odors identified based on processing the single odor data instance and the response may also identify each of the multiple odors. Additionally, or alternatively, the automated assistant may select a given odor, of the multiple odors, for which to generate output and to identify in the response.

Further, although the examples of FIGS. 4A, 4B, 5A, and 5B are described with respect to the environments of the various client devices corresponding to outdoors and indoors at a primary dwelling of the user 101, it should be understood that is also for the sake of example and is not meant to be limiting. For example, techniques described herein may be implemented in a medical setting (e.g., in hospitals, at a primary dwelling of the user as part of a telemedicine session, etc.) to identify odors that are indicative of diseases, ailments, or other medical conditions (e.g., based on one or more odors emitted by a body of the user 101). In these examples, the user 101 may be required to consent to processing of the odor data instances in view of privacy considerations.

Moreover, although the examples of FIGS. 4A, 4B, 5A, and 5B are not described with respect to providing any advertisements, it should be understood that is also for the sake of example and is not meant to be limiting. For example, again assume that a baseline odor indicative of a pumpkin scented candle is established in the primary dwelling of the user 101. In this example, and in response to determining that a given odor data instance obtained periodically excludes the odor usually emitted by the pumpkin scented candle, a notification that enables the user 101 to provide a single user input (e.g., "one-click") to order more pumpkin scented candles may be provided and/or an offer for discounted pumpkin scented candles may be provided for presentation to the user 101. As another example, assume that the user 101 is walking through a mall and that a given odor data instance obtained periodically includes an odor corresponding to a hot pretzel. In this example, a notification that includes an offer for the hot pretzel may be provided for presentation to the user 101.

Figure 6:
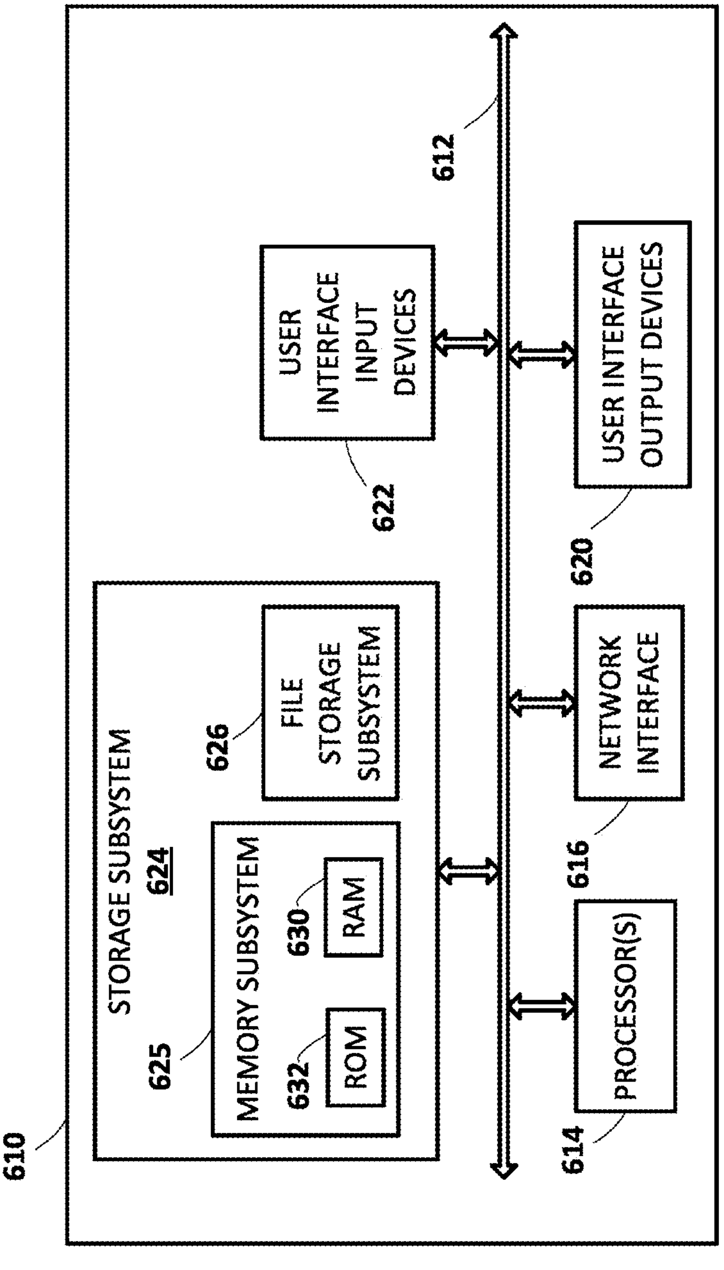
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, from a user, a request to identify an odor in an environment of a client device of the user; in response to receiving the request to identify the odor in the environment of the client device, processing an odor data instance, generated by an odor sensor of the client device of the user, to generate output; identifying, based on the output, the odor in the environment of the client device of the user; generating a response to the request that identifies at least the odor in the environment of the client device of the user; and causing the response to the request to be provided for presentation to the user via the client device.

These and other implementations of technology disclosed herein can optionally include one or more of the following features.

In some implementations, processing the odor data instance generated by the odor sensor of the client device of the user to generate output may include accessing a previously generated index of a superset of corresponding odors, the previously generated index of the superset of corresponding odors being a mapping of corresponding previous odor data instances to the corresponding previous odors; and comparing the odor data instance generated by the odor sensor of the client device of the user to the corresponding previous odor data instances mapped to the corresponding previous odors to select a subset of one or more of the corresponding previous odors as the output. In some versions of those implementations, identifying the odor in the environment of the client device of the user based on the output includes selecting, based on comparing the odor data instance generated by the odor sensor of the client device of the user to the corresponding previous odor data instances, the odor in the environment of the client device of the user and from among the subset of one or more of the corresponding previous odors.

In some further versions of those implementations, identifying the odor in the environment of the client device of the user may be further based on contextual information associated with the client device of the user. The contextual information associated with the client device may include one or more of: a geographical region in which the client device is located, whether the client device is located inside or outside, a time of day, or a day of year. In yet further versions of those implementations, the contextual information associated with the client device of the user is utilized in selecting the odor in the environment of the client device of the user and from among the subset of one or more of the corresponding previous odors.

In additional or alternative further versions of those implementations, identifying the odor in the environment of the client device of the user may be further based on one or more terms of the request to identify the odor in the environment of the client device of the user, wherein one or more terms of the request include a characteristic of the odor. In yet further versions of those implementations, one or more of the terms of the request to identify the odor in the environment of the client device of the user may be utilized in selecting the odor in the environment of the client device of the user and from among the subset of one or more of the corresponding previous odors.

In some implementations, processing the odor data instance generated by the odor sensor of the client device of the user to generate output may include processing, using an odor machine learning (ML) model, the odor data instance generated by the odor sensor of the client device of the user to generate an odor embedding as the output, the odor embedding being a lower-level representation of the odor data instance that is mapped to an embedding space.

In some versions of those implementations, identifying the odor in the environment of the client device of the user based on the output may include selecting, based on comparing the odor embedding to a plurality of previously generated odor embeddings, in the embedding space, the odor in the environment of the client device of the user.

In additional or alternative versions of those implementations, the odor ML model may be trained based on a plurality of training instances. Training the odor ML model based on a given training instance, of the plurality of training instance, may include processing, using the odor ML model, training instance input of the given training instance to generate a given odor embedding for a given odor, the training instance input including one or more of: a given odor data instance for the given odor, contextual information associated with the given odor, or one or more terms associated with the given odor; and assigning the given odor embedding to a given portion of the embedding space; and labelling the given portion of the embedding space with training instance output of the given training instance, the training instance output including one or more of: a label for the given odor, a label for a characteristic of the given odor, or a source of the given odor.

In additional or alternative versions of those implementations, processing the odor data instance generated by the odor sensor of the client device of the user to generate output may further include processing, using the odor ML model and along with the odor data instance generated by the odor sensor of the client device of the user, contextual information associated with the client device to generate the output. The contextual information associated with the client device may include one or more of: a geographical region in which the client device is located, whether the client device is located inside or outside, a time of day, or a day of year.

In additional or alternative versions of those implementations, processing the odor data instance generated by the odor sensor of the client device of the user to generate output may further include processing, using the odor ML model and along with the odor data instance generated by the odor sensor of the client device of the user, one or more terms of the request to generate the output.

In some implementations, the request to identify the odor in the environment of the client device may be received at a given time instance, and the odor data instance may be generated by the odor sensor of the client device of the user at the given time instance.

In some implementations, the method may further include identifying, based on the output, a source of the odor in the environment of the client device of the user. The response to the request may further identify the source of the odor in the environment of the client device of the user.

In some implementations, generating the response to the request that identifies at least the odor in the environment of the client device of the user may include generating synthesized speech audio data that captures synthesized speech identifying at least the odor in the environment of the client device. Causing the response to the request to be provided for presentation to the user via the client device may include causing the synthesized speech audio data to be rendered for audible presentation to the user via one or more speakers of the client device.

In some implementations, the response to the request that identifies at least the odor in the environment of the client device of the user may include generating visual content identifying at least the odor in the environment of the client device. Causing the response to the request to be provided for presentation to the user via the client device may include causing the visual content to be rendered for visual presentation to the user via a display of the client device.

In some implementations, the method may further include generating, based on the odor that is identified in the environment of the client device of the user, a query; and executing, based on the query, a search over one or more databases to obtain content that is responsive to the query. In some versions of those implementations, the response to the request that is provided for presentation to the user via the client device may include the content that is responsive to the query.

In some implementations, a method implemented by one or more processors is provided, and includes, at a plurality of time instances: obtaining corresponding odor data instances generated by an odor sensor of a client device of a user; processing the corresponding odor data instances to generate corresponding outputs for the corresponding odor data instances; and identifying, based on corresponding outputs, one or more baseline odors in an environment of the client device; and at a subsequent time instance that is subsequent to each of the plurality of time instances: obtaining a given odor data instance generated by the odor sensor of the client device of the user or an additional odor sensor of an additional client device of the user that is co-located in the environment of the client device; processing the given odor data instance to generate given output for the given odor data instance; identifying, based on the given output, a given odor in the environment of the client device; and in response to determining that the given odor in the environment of the client does not correspond to one or more of the baseline odors: generating a notification that identifies the given odor and that indicates the given odor does not correspond to one or more of the baseline odors; and causing the notification that identifies the given odor and that indicates the given odor does not correspond to one or more of the baseline odors to be provided for presentation to the user via the client device.

These and other implementations of technology disclosed herein can optionally include one or more of the following features.

In some implementations, identifying a given baseline odor, of the one or more baseline odors, in the environment of the client device based on the corresponding outputs may include identifying the given baseline odor at a threshold quantity of time instances of the plurality of time instances.

In some implementations, a method implemented by one or more processors is provided, and includes, at a plurality of time instances: obtaining corresponding odor data instances generated by an odor sensor of a client device of a user; processing the corresponding odor data instances to generate corresponding outputs for the corresponding odor data instances; and identifying, based on corresponding outputs, one or more baseline odors in an environment of the client device; and at a subsequent time instance that is subsequent to the plurality of time instances: receiving, from the user, a request to identify a given odor in the environment of the client device of the user; in response to receiving the request to identify the odor in the environment of the client device, processing a given odor data instance generated by the odor sensor of the client device of the user to generate given output; identifying, based on the given output, the given odor in the environment of the client device of the user that is in addition to the one or more baseline odors in the environment of the client device; generating a response to the request that identifies at least the given odor in the environment of the client device of the user; and causing the response to the request to be provided for presentation to the user via the client device.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

The invention claimed is:

1. A method implemented by one or more processors, the method comprising:

at a plurality of time instances:

obtaining corresponding odor data instances generated by an odor sensor of a client device of a user;

processing the corresponding odor data instances to generate corresponding outputs for the corresponding odor data instances; and identifying, based on the corresponding outputs, one or more baseline odors associated with a physical environment of the client device; and at a subsequent time instance that is subsequent to each of the plurality of time instances:

obtaining a given odor data instance generated by the odor sensor of the client device of the user or an additional odor sensor of an additional client device of the user that is co-located in the physical environment of the client device;

processing the given odor data instance to generate given output for the given odor data instance;

identifying, based on the given output, a given odor in the physical environment of the client device;

determining that the given odor in the physical environment of the client device does not correspond to one or more of the baseline odors associated with the physical environment of the client device; and in response to determining that the given odor in the physical environment of the client device that does not correspond to one or more of the baseline odors associated with the physical environment of the client device:

generating synthesized speech audio data that captures synthesized speech identifying the given odor in the physical environment of the client device; and causing the synthesized speech audio data that captures the synthesized speech identifying the given odor in the physical environment of the client device to be rendered for audible presentation to the user via one or more speakers of the client device or the additional client device of the user.

2. The method of claim 1, wherein identifying a given baseline odor, of the one or more baseline odors, in the physical environment of the client device based on the corresponding outputs comprises:

identifying the given baseline odor at a threshold quantity of time instances of the plurality of time instances; and storing, in an index that includes at least the one or more baseline odors, an indication of the given baseline odor.

3. The method of claim 2, further comprising:

storing, in the index that includes at least the one or more baseline odors, and in association with the given baseline odor, one or more terms that describe a characteristic of the given baseline odor.

4. The method of claim 3, wherein the synthesized speech further identifies an indication of the characteristic of the given odor.

5. The method of claim 1, wherein the synthesized speech further identifies an indication that the given odor in the physical environment of the client device does not correspond to the one or more baseline odors.

6. The method of claim 1, further comprising:

generating, based on the given odor in the physical environment of the client device of the user, a query; and executing, based on the query, a search over one or more databases to obtain content that is responsive to the query.

7. The method of claim 6, wherein the synthesized speech further identifies the content that is responsive to the query.

8. A system comprising:

at least one processor; and memory storing instructions that, when executed by the at least one processor, cause the at least one processor to be operable to:

at a plurality of time instances:

obtain corresponding odor data instances generated by an odor sensor of a client device of a user;

process the corresponding odor data instances to generate corresponding outputs for the corresponding odor data instances; and identify, based on the corresponding outputs, one or more baseline odors associated with a physical environment of the client device; and at a subsequent time instance that is subsequent to each of the plurality of time instances:

obtain a given odor data instance generated by the odor sensor of the client device of the user or an additional odor sensor of an additional client device of the user that is co-located in the physical environment of the client device;

process the given odor data instance to generate given output for the given odor data instance;

identify, based on the given output, a given odor in the physical environment of the client device;

determine that the given odor in the physical environment of the client device does not correspond to one or more of the baseline odors associated with the physical environment of the client device; and in response to determining that the given odor in the physical environment of the client device that does not correspond to one or more of the baseline odors associated with the physical environment of the client device:

generate synthesized speech audio data that captures synthesized speech identifying the given odor in the physical environment of the client device; and cause the synthesized speech audio data that captures the synthesized speech identifying the given odor in the physical environment of the client device to be rendered provided for audible presentation to the user via one or more speakers of the client device or the additional client device of the user.

9. The system of claim 8, wherein the instructions to identify a given baseline odor, of the one or more baseline odors, in the physical environment of the client device based on the corresponding outputs comprise instructions to:

identify the given baseline odor at a threshold quantity of time instances of the plurality of time instances; and store, in an index that includes at least the one or more baseline odors, an indication of the given baseline odor.

10. The system of claim 9, wherein the at least one processor is further operable to:

store, in the index that includes at least the one or more baseline odors, and in association with the given baseline odor, one or more terms that describe a characteristic of the given baseline odor.

11. The system of claim 10, wherein the synthesized speech further identifies an indication of the characteristic of the given odor.

12. The system of claim 8, wherein the synthesized speech further identifies an indication that the given odor in the physical environment of the client device does not correspond to the one or more baseline odors.

13. The system of claim 8, wherein the at least one processor is further operable to:

generate, based on the given odor in the physical environment of the client device of the user, a query; and execute, based on the query, a search over one or more databases to obtain content that is responsive to the query.

14. The system of claim 13, wherein the synthesized speech further identifies the content that is responsive to the query.

15. A non-transitory computer-readable storage medium storing instructions that, when executed by at least one processor, cause the at least one processor to be operable to perform operations, the operations comprising:

at a plurality of time instances:

obtaining corresponding odor data instances generated by an odor sensor of a client device of a user;

processing the corresponding odor data instances to generate corresponding outputs for the corresponding odor data instances; and identifying, based on the corresponding outputs, one or more baseline odors associated with a physical environment of the client device; and at a subsequent time instance that is subsequent to each of the plurality of time instances:

obtaining a given odor data instance generated by the odor sensor of the client device of the user or an additional odor sensor of an additional client device of the user that is co-located in the physical environment of the client device;

processing the given odor data instance to generate given output for the given odor data instance;

identifying, based on the given output, a given odor in the physical environment of the client device;

determining that the given odor in the physical environment of the client device does not correspond to one or more of the baseline odors associated with the physical environment of the client device; and in response to determining that the given odor in the physical environment of the client device that does not correspond to one or more of the baseline odors associated with the physical environment of the client device:

generating synthesized speech audio data that captures synthesized speech identifying the given odor in the physical environment of the client device; and causing the synthesized speech audio data that captures the synthesized speech identifying the given odor in the physical environment of the client device to be rendered for audible presentation to the user via one or more speakers of the client device or the additional client device of the user.

16. The non-transitory computer-readable storage medium of claim 15, wherein identifying a given baseline odor, of the one or more baseline odors, in the physical environment of the client device based on the corresponding outputs comprises:

identifying the given baseline odor at a threshold quantity of time instances of the plurality of time instances; and storing, in an index that includes at least the one or more baseline odors, an indication of the given baseline odor.

17. The non-transitory computer-readable storage medium of claim 16, the operations further comprising:

storing, in the index that includes at least the one or more baseline odors, and in association with the given baseline odor, one or more terms that describe a characteristic of the given baseline odor.

18. The non-transitory computer-readable storage medium of claim 17, wherein the synthesized speech further identifies an indication of the characteristic of the given odor.

19. The non-transitory computer-readable storage medium of claim 15, wherein the synthesized speech further identifies an indication that the given odor in the physical environment of the client device does not correspond to the one or more baseline odors.

20. The non-transitory computer-readable storage medium of claim 15, the operations further comprising:

generating, based on the given odor in the physical environment of the client device of the user, a query; and executing, based on the query, a search over one or more databases to obtain content that is responsive to the query, wherein the synthesized speech further identifies the content that is responsive to the query.

* * * * *